US007657910B1

(12) United States Patent
McAulay et al.

(10) Patent No.: US 7,657,910 B1
(45) Date of Patent: Feb. 2, 2010

(54) DISTRIBUTED ELECTRONIC ENTERTAINMENT METHOD AND APPARATUS

(75) Inventors: Roger McAulay, San Francisco, CA (US); Samuel Cohen, San Francisco, CA (US)

(73) Assignee: e-cast Inc., San Francisco, CA (US)

( * ) Notice: Subject to any disclaimer, the term of this patent is extended or adjusted under 35 U.S.C. 154(b) by 0 days.

(21) Appl. No.: 09/519,008

(22) Filed: Mar. 3, 2000

Related U.S. Application Data

(60) Provisional application No. 60/145,607, filed on Jul. 26, 1999.

(51) Int. Cl.
*H04N 7/173* (2006.01)
*G06F 3/00* (2006.01)

(52) U.S. Cl. .......................... 725/61; 725/98; 725/141; 715/716

(58) Field of Classification Search ................... 705/18; 725/37, 61, 86, 87, 101, 98, 126, 141, 142; 369/30.06, 30.08; 711/100, 111; 715/716, 715/783, 829, 830
See application file for complete search history.

(56) References Cited

U.S. PATENT DOCUMENTS

| | | | |
|---|---|---|---|
| 3,718,906 A | 2/1973 | Lightner | 340/147 R |
| 3,964,025 A | 6/1976 | Oosterhouse | 340/162 |
| 3,985,217 A | 10/1976 | Kortenhaus et al. | 194/15 |
| 4,045,776 A | 8/1977 | Wheelwright et al. | 340/162 |
| 4,232,295 A | 11/1980 | McConnell | 340/152 R |
| 4,335,809 A | 6/1982 | Wain | 194/1 R |
| 4,359,631 A | 11/1982 | Lockwood et al. | 235/381 |
| 4,412,292 A | 10/1983 | Sedam et al. | 364/479 |
| 4,521,014 A | 6/1985 | Sitrick | 273/1 GC |

(Continued)

FOREIGN PATENT DOCUMENTS

EP  0 843 272 A1  5/1998

(Continued)

OTHER PUBLICATIONS

Shannon, Victoria, Board Bulletin—David Clark, The Washington Post, Jul. 26, 1995 Final Edition, 2 pages.*

(Continued)

*Primary Examiner*—Andrew Joseph Rudy
(74) *Attorney, Agent, or Firm*—Van Pelt, Yi & James LLP

(57) ABSTRACT

A distributed electronic entertainment method and apparatus are described. In one embodiment, a central management resource is coupled to multiple out-of-home venues through a wide area network (WAN). The central management resource stores content and performs management, monitoring and entertainment content delivery functions. At each venue at least one entertainment unit is coupled to the WAN. Multiple entertainment units in a venue are coupled to each other through a local area network (LAN). In one embodiment, an entertainment unit includes a user interface that comprises at least one graphical user interface (GUI). The entertainment unit further comprises a local memory device that stores entertainment content comprising music, a peripheral interface, and a user input device. A plurality of peripheral devices are coupled to the at least one entertainment unit via the peripheral interface, wherein a user, through the user input device and the user interface, performs at least one activity from a group comprising, playing music, playing electronic games, viewing television content, and browsing the Internet.

12 Claims, 27 Drawing Sheets

U.S. PATENT DOCUMENTS

| | | | |
|---|---|---|---|
| 4,528,643 A | 7/1985 | Freeny, Jr. | 364/900 |
| 4,572,509 A | 2/1986 | Sitrick | 273/85 G |
| RE32,115 E | 4/1986 | Lockwood et al. | 235/381 |
| 4,582,324 A | 4/1986 | Koza et al. | 273/138 A |
| 4,636,951 A | 1/1987 | Harlick | 364/412 |
| 4,652,998 A | 3/1987 | Koza et al. | 364/412 |
| 4,654,799 A | 3/1987 | Ogaki et al. | 364/479 |
| 4,658,093 A | 4/1987 | Hellman | 380/25 |
| 4,667,802 A | 5/1987 | Verduin et al. | 194/217 |
| 4,761,684 A | 8/1988 | Clark et al. | 358/86 |
| 4,766,581 A | 8/1988 | Korn et al. | 369/30 |
| 4,811,325 A | 3/1989 | Sharples, Jr. et al. | 369/85 |
| 4,817,043 A | 3/1989 | Brown | 364/518 |
| 4,920,432 A | 4/1990 | Eggers et al. | 360/33.1 |
| 4,922,420 A | 5/1990 | Nakagawa et al. | 364/410 |
| 4,937,807 A | 6/1990 | Weitz et al. | 369/85 |
| 4,949,187 A | 8/1990 | Cohen | 358/335 |
| 4,956,768 A | 9/1990 | Sidi et al. | 364/200 |
| 4,958,835 A | 9/1990 | Tashiro et al. | 273/85 G |
| 5,041,921 A | 8/1991 | Scheffler | 360/13 |
| 5,057,915 A | 10/1991 | Von Kohorn | 358/84 |
| 5,191,573 A | 3/1993 | Hair | 369/84 |
| 5,191,611 A | 3/1993 | Lang | 380/25 |
| 5,191,615 A | 3/1993 | Aldava et al. | 381/3 |
| 5,204,947 A | 4/1993 | Bernstein et al. | 395/157 |
| 5,255,358 A | 10/1993 | Busboom et al. | 395/153 |
| 5,278,909 A | 1/1994 | Edgar | 381/17 |
| 5,341,350 A | 8/1994 | Frank et al. | 369/30 |
| 5,353,400 A | 10/1994 | Nigawara et al. | 395/161 |
| 5,355,302 A | 10/1994 | Martin et al. | 364/410 |
| 5,365,381 A | 11/1994 | Scheffler | 360/15 |
| 5,384,910 A | 1/1995 | Torres | 395/156 |
| 5,388,181 A * | 2/1995 | Anderson et al. | 395/212 |
| 5,440,644 A | 8/1995 | Farinelli et al. | 381/81 |
| 5,445,295 A | 8/1995 | Brown | |
| 5,497,502 A * | 3/1996 | Castille | 455/5.1 |
| 5,539,735 A * | 7/1996 | Moskowitz | 370/420 |
| 5,541,638 A | 7/1996 | Story | 348/7 |
| 5,541,917 A | 7/1996 | Farris | 370/60.1 |
| 5,557,658 A | 9/1996 | Gregorek et al. | 379/67 |
| 5,668,788 A | 9/1997 | Allison | 369/30 |
| 5,678,012 A | 10/1997 | Kimmich et al. | 395/327 |
| 5,691,964 A * | 11/1997 | Niederlein et al. | 369/30.06 |
| 5,696,906 A | 12/1997 | Peters et al. | 395/234 |
| 5,726,909 A | 3/1998 | Krikorian | 364/514 R |
| 5,751,672 A * | 5/1998 | Yankowski | 709/238 |
| 5,761,071 A | 6/1998 | Bernstein et al. | 364/479.07 |
| 5,774,652 A | 6/1998 | Smith | 395/186 |
| 5,781,889 A | 7/1998 | Martin et al. | 705/1 |
| 5,835,843 A * | 11/1998 | Haddad | 725/115 |
| 5,848,398 A | 12/1998 | Martin et al. | 705/14 |
| 5,861,906 A * | 1/1999 | Dunn et al. | 725/87 |
| 5,884,284 A | 3/1999 | Peters et al. | 705/30 |
| 5,899,699 A * | 5/1999 | Kamiya | 434/307 A |
| 5,918,213 A * | 6/1999 | Bernard et al. | 705/26 |
| 5,924,071 A * | 7/1999 | Morgan et al. | 704/278 |
| 5,930,473 A * | 7/1999 | Teng et al. | 709/204 |
| 5,930,765 A * | 7/1999 | Martin | 705/14 |
| 5,931,901 A * | 8/1999 | Wolfe et al. | 709/206 |
| 5,959,945 A * | 9/1999 | Kleiman | 369/30 |
| 5,963,916 A * | 10/1999 | Kaplan | 705/26 |
| 6,031,795 A * | 2/2000 | Wehmeyer | 369/30.28 |
| 6,049,823 A * | 4/2000 | Hwang | 725/82 |
| 6,078,848 A * | 6/2000 | Bernstein et al. | 700/237 |
| 6,084,168 A * | 7/2000 | Sitrick | 84/477 R |
| 6,161,142 A * | 12/2000 | Wolfe et al. | 709/230 |
| 6,163,795 A * | 12/2000 | Kikinis | 709/203 |
| 6,173,317 B1 * | 1/2001 | Chaddha et al. | 709/219 |
| 6,248,946 B1 * | 6/2001 | Dwek | 84/609 |
| 6,295,555 B1 * | 9/2001 | Goldman | 709/219 |
| 6,304,915 B1 * | 10/2001 | Nguyen et al. | 709/250 |
| 6,308,204 B1 * | 10/2001 | Nathan et al. | 709/221 |
| 6,314,573 B1 * | 11/2001 | Gordon et al. | 725/61 |
| 6,314,575 B1 * | 11/2001 | Billock et al. | 725/87 |
| 6,346,951 B1 * | 2/2002 | Mastronardi | 715/716 |
| 6,363,411 B1 * | 3/2002 | Dugan et al. | 709/202 |
| 6,381,575 B1 * | 4/2002 | Martin et al. | 705/1 |
| 6,385,596 B1 * | 5/2002 | Wiser et al. | 705/51 |
| 6,396,531 B1 * | 5/2002 | Gerszberg et al. | 348/14.01 |
| 6,397,189 B1 * | 5/2002 | Martin et al. | 705/1 |
| 6,442,285 B2 * | 8/2002 | Rhoads et al. | 382/100 |
| 6,469,239 B1 * | 10/2002 | Fukuda | 84/602 |
| 6,477,532 B1 * | 11/2002 | Duliege | 707/10 |
| 6,487,145 B1 * | 11/2002 | Berhan | 369/30.15 |
| 6,504,089 B1 * | 1/2003 | Nagasawa et al. | 84/609 |
| 6,522,342 B1 * | 2/2003 | Gagnon et al. | 345/716 |
| 6,553,409 B1 * | 4/2003 | Zhang et al. | 709/213 |
| 6,563,769 B1 * | 5/2003 | Van Der Meulen | 369/30.06 |
| 6,564,380 B1 * | 5/2003 | Murphy | 725/86 |
| 6,571,390 B1 * | 5/2003 | Dunn et al. | 725/52 |
| 6,578,051 B1 * | 6/2003 | Mastronardi et al. | 707/104.1 |
| 6,587,403 B1 * | 7/2003 | Keller et al. | 369/30.06 |
| 6,805,634 B1 * | 10/2004 | Wells et al. | 463/42 |
| 6,868,403 B1 * | 3/2005 | Wiser et al. | 705/51 |
| 6,915,451 B2 * | 7/2005 | Fitzgerald et al. | 714/20 |
| 6,970,834 B2 * | 11/2005 | Martin et al. | 705/14 |
| 6,978,127 B1 * | 12/2005 | Bulthuis et al. | 455/412.1 |
| 7,010,801 B1 * | 3/2006 | Jerding et al. | 725/95 |
| 7,117,516 B2 * | 10/2006 | Khoo et al. | 725/46 |
| 7,133,845 B1 * | 11/2006 | Ginter et al. | 705/51 |
| 7,263,497 B1 * | 8/2007 | Wiser et al. | 705/26 |
| 7,383,564 B2 * | 6/2008 | White et al. | 725/89 |
| 7,392,532 B2 * | 6/2008 | White et al. | 725/135 |
| 7,493,643 B2 * | 2/2009 | Ellis | 725/61 |
| 7,493,647 B2 * | 2/2009 | White et al. | 725/87 |
| 2001/0025259 A1 * | 9/2001 | Rouchon | 705/26 |
| 2002/0035644 A1 * | 3/2002 | Scibora | 709/247 |

FOREIGN PATENT DOCUMENTS

| | | | |
|---|---|---|---|
| GB | 2 062 935 A | 5/1981 | |
| GB | 2 170 943 A | 8/1986 | |
| GB | 2 193 420 A | 2/1988 | |
| WO | WO 97/45796 | 12/1997 | |
| WO | WO 98/45835 | 10/1998 | |

OTHER PUBLICATIONS

Tatsuya et al., "Music Server System: Distributed Music System on Local Area Network" Journal of Information Processing, Abstract, vol. 15, No. 01-001, Jun. 19, 2001.*

Jeffrey Fritz, "True believers say isochronous Ethernet will bring digital video to the desktop sooner", Byte.com, May 1995, 15 pages.*

Maurer, H., "The A.E.I.O.U. Hypermedia Project", *IEEE*, (1994), pp. 192-196.

"Darts Revolution Again", *RePlay Magazine*, Mar. 1991, p. 146.

* cited by examiner

Now PLaying: Tender

Blur
*out of focus*
1. Tender
2. Bugman
3. Coffee & T.V.
4. Swamp Song
5. 1992
6. B.L.U.R.E.M.I.
7. Battle
8. Mellow Song
9. Trailerpark
10. Caramel
11. Trimm Trabb
12. No Distance Left To Run
13. Optigan 1

Return To Music

FIG. 21

DISTRIBUTED ELECTRONIC ENTERTAINMENT METHOD AND APPARATUS

RELATED APPLICATIONS

This application claims priority from U.S. Provisional Patent Application Ser. No. 60/145,607, filed Jul. 26, 1999.

FIELD OF THE INVENTION

The invention is in the field of electronic entertainment systems. More particularly, the invention is in the field of electronic music and game machines for use in out-of-home venues.

BACKGROUND OF THE INVENTION

Traditional entertainment systems for out-of-home use, for example in restaurants or bars, are typified by the jukebox that automatically plays selected gramophone records or compact discs after the insertion of a coin or coins. Originally, jukebox units were stand-alone units in venues such as restaurants and bars. More recently, game entertainment units have been placed in venues to allow patrons to play electronic games, such as electronic card games, after insertion of a fee using coins or some other method of payment. One disadvantage of some prior entertainment systems is that each freestanding unit, be it a music unit or a game unit, has a relatively small collection of music or games stored on the unit itself. This limits the user's selection and also requires that the available selection of games or music be updated when it includes too many unpopular selections.

Some prior systems have the capability to update a music selection from a remote location. In such a system, the update procedure occurs at intervals and during the update procedure the music unit is inoperative. It is a disadvantage of prior systems that the update procedure requires taking a music unit out of operation. This may necessitate performing updates more infrequently than may be desirable and precludes the real-time download of user-requested music during the operation of the unit. Another disadvantage of prior systems is that the way in which music selections are updated and stored is inefficient in terms of processing time and storage space required. For example, in some prior systems a separate catalog file containing song identification information and memory management information must be stored on the music unit.

Another limitation of traditional electronic entertainment systems is that even in venues where both music entertainment and game entertainment exist, game entertainment units and music entertainment units with individual capabilities exist separately. A user of a game unit, for example, cannot play music available in the venue without leaving the game unit to go to the music unit.

Yet another limitation of existing electronic entertainment systems is that they do not have real-time access to the Internet so that users in a venue may access the Internet for activities such as Internet browsing and shopping or playing tournament games from the same unit that allows music selection. Existing electronic entertainment systems are further limited in that they do not allow easy integration of a variety of peripheral devices, such as payment hardware and software or external game controllers.

SUMMARY OF THE DISCLOSURE

A distributed electronic entertainment method and apparatus are described. In one embodiment, a central management resource is coupled to multiple out-of-home venues through a wide area network (WAN). The central management resource stores content and performs management, monitoring and entertainment content delivery functions. At each venue at least one entertainment unit is coupled to the WAN. Multiple entertainment units in a venue are coupled to each other through a local area network (LAN). In one embodiment, an entertainment unit includes a user interface that comprises at least one graphical user interface (GUI). The entertainment unit further comprises a local memory device that stores entertainment content comprising music, a peripheral interface, and a user input device. A plurality of peripheral devices are coupled to the at least one entertainment unit via the peripheral interface, wherein a user, through the user input device and the user interface, performs at least one activity from a group comprising, playing music, playing electronic games, viewing television content, viewing movies, and browsing the Internet.

BRIEF DESCRIPTION OF THE DRAWINGS

FIGS. 13-22 show GUI screens relating to playing music according to one embodiment.

DETAILED DESCRIPTION

A distributed electronic entertainment system is described. In various embodiments, the system provides the capabilities of selecting and playing music, selecting and playing games, including network games, viewing television content, viewing movies, Internet web browsing, and conducting e-commerce transactions from a single unit in a venue. In one embodiment, the system includes multiple entertainment units in a single venue that communicate with each other through a local area network (LAN). Each entertainment unit in the venue also communicates with a wide area network (WAN) and the Internet, either directly or through another entertainment unit in the venue.

Figure 1:
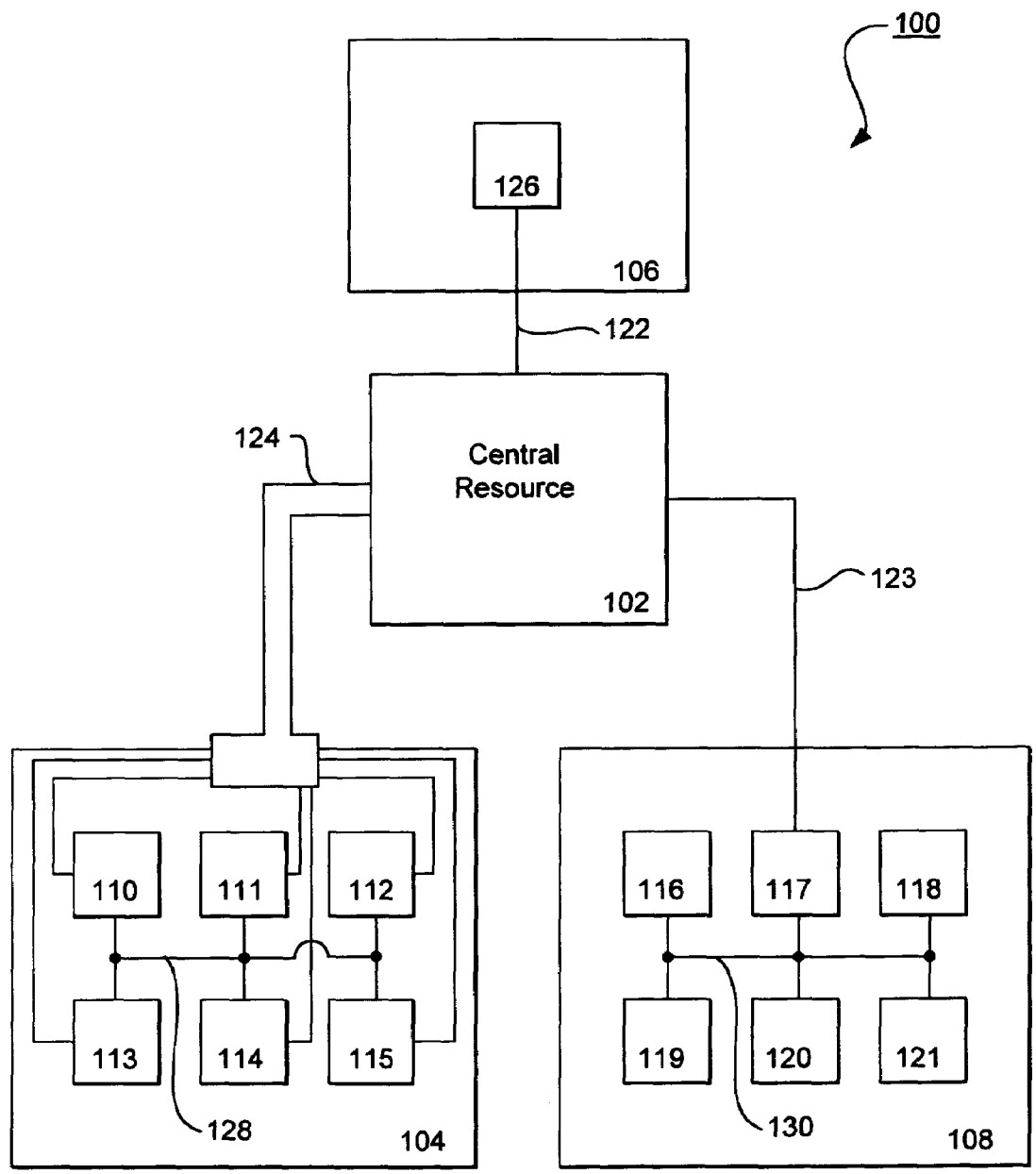
FIG. 1 is a block diagram of an embodiment of a distributed entertainment system.

FIG. 1 is a block diagram of the distributed electronic entertainment system 100 of one embodiment. System 100 includes central management resource 102 which is connected to multiple entertainment venues through respective wide area network (WAN) connections 122, 123, and 124. Any physical or wireless WAN and any WAN protocol may be used. The WAN connection may be persistent or intermittent. For example, transmission protocol over Internet protocol (TCP/IP), asynchronous transmission mode (ATM), integrated services digital network (ISDN), and digital subscriber line (DSL) may all be used. The WAN may be a physical carrier network, or a satellite or radio frequency (RF) wireless network. Central resource 102 is connected to venues 104, 106, and 108. Each venue connected to central management resource 102 may have one of a variety of configurations of entertainment units. System 100 includes some exemplary configurations.

Each of venues 104, 106, and 108 may be any physical location including a restaurant, a bar, an airport, a residence, etc. Venue 106 includes a single entertainment unit 126. Entertainment unit 126 communicates directly with central management resource 102 through WAN connection 122. Entertainment unit 126 may be capable of a variety of functions including, playing music stored locally on entertainment unit 126 or stored remotely on central management resource 102, playing games, including Internet hosted games, and Internet browsing. In some embodiments, the entertainment unit is further coupled to a data port separate from the WAN (not shown) so that a user may connect, for example, a laptop computer while accessing the functionality of the entertainment unit at the same time. The WAN connection may also serve as a data port.

Entertainment unit 126 is configured to accept a variety of peripheral units, such as payment hardware and software, a video camera, an external game controller, and user recognition hardware and software for performing thumbprint recognition or facial feature recognition. In various embodiments, unit 126 may be physically configured to stand on the floor of a venue, be attached to a wall, or sit on a countertop or table.

In venue 104, each of entertainment units 110-115 communicate with the central management resource 102 through a respective one of multiple WAN connections 124. Each of entertainment units 110-115 may have at least all of the capabilities described with reference to entertainment unit 126 or any subset of those capabilities or additional capabilities. Entertainment units 110-115 further communicate with each other through local area network (LAN) 128. The LAN 128 may use any physical or wireless network connections and any protocol. For example, the LAN may include TCP/IP, NetBIOS extended user interface (NetBEUI), or secure sockets layer (SSL).

In venue 108, primary entertainment unit 117 communicates directly with the central management resource 102 through WAN connection 123. All of the entertainment units 116-121 communicate with each other through LAN 130, which is similar to LAN 128. Each of secondary entertainment units 116 and 118-121 communicate with the central management resource 102 indirectly through the primary entertainment unit 117. The entertainment units 116-121 may have at least all of the capabilities described with reference to entertainment unit 126 or any subset of those capabilities or additional capabilities. In other embodiments, more than one entertainment unit in a venue may be a primary unit in that it communicates directly with the central management resource 102 both for itself and for secondary entertainment units coupled to it through a LAN.

Figure 2:
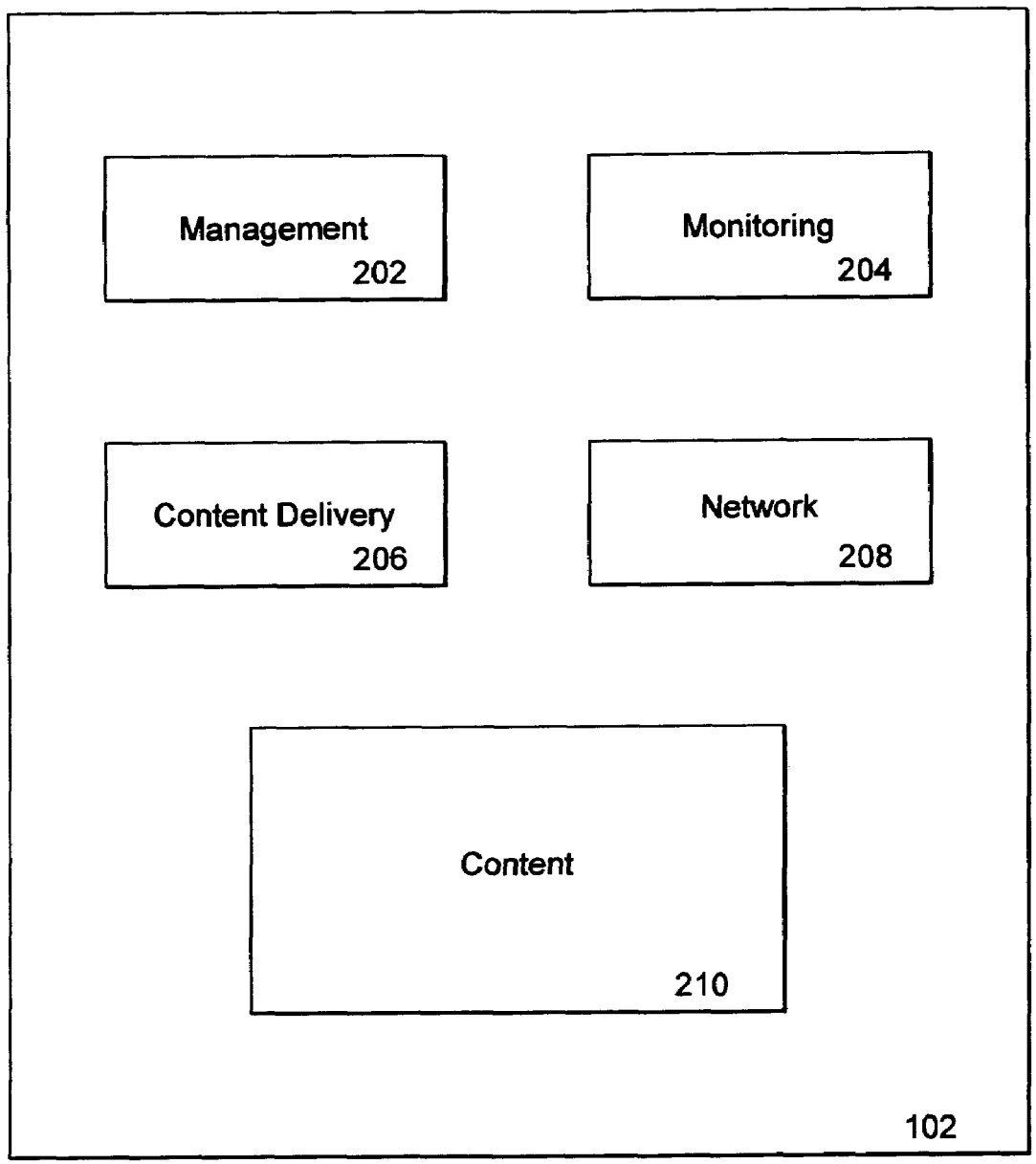
FIG. 2 is a block diagram of an embodiment of a central management resource.

FIG. 2 is a block diagram of an embodiment of the central management resource 102. Central resource 102 includes management module 202, including management hardware and software, monitoring module 204, including monitoring hardware and software, content delivery module 206, including content delivery hardware and software, and networking module 208, including networking hardware and software. Entertainment content 220 includes stored music in digital form, electronic games, and digital versatile disc (DVD) movies.

Management hardware and software 202 performs administrative functions for venues connected through the WAN. Monitoring hardware and software 204 monitors the health of system components in venues 104, 106, and 108 and collects and stores data related to usage. Content delivery hardware and software 206 controls the delivery of content from content storage 210 to venues 104, 106, and 108.

Figure 3:
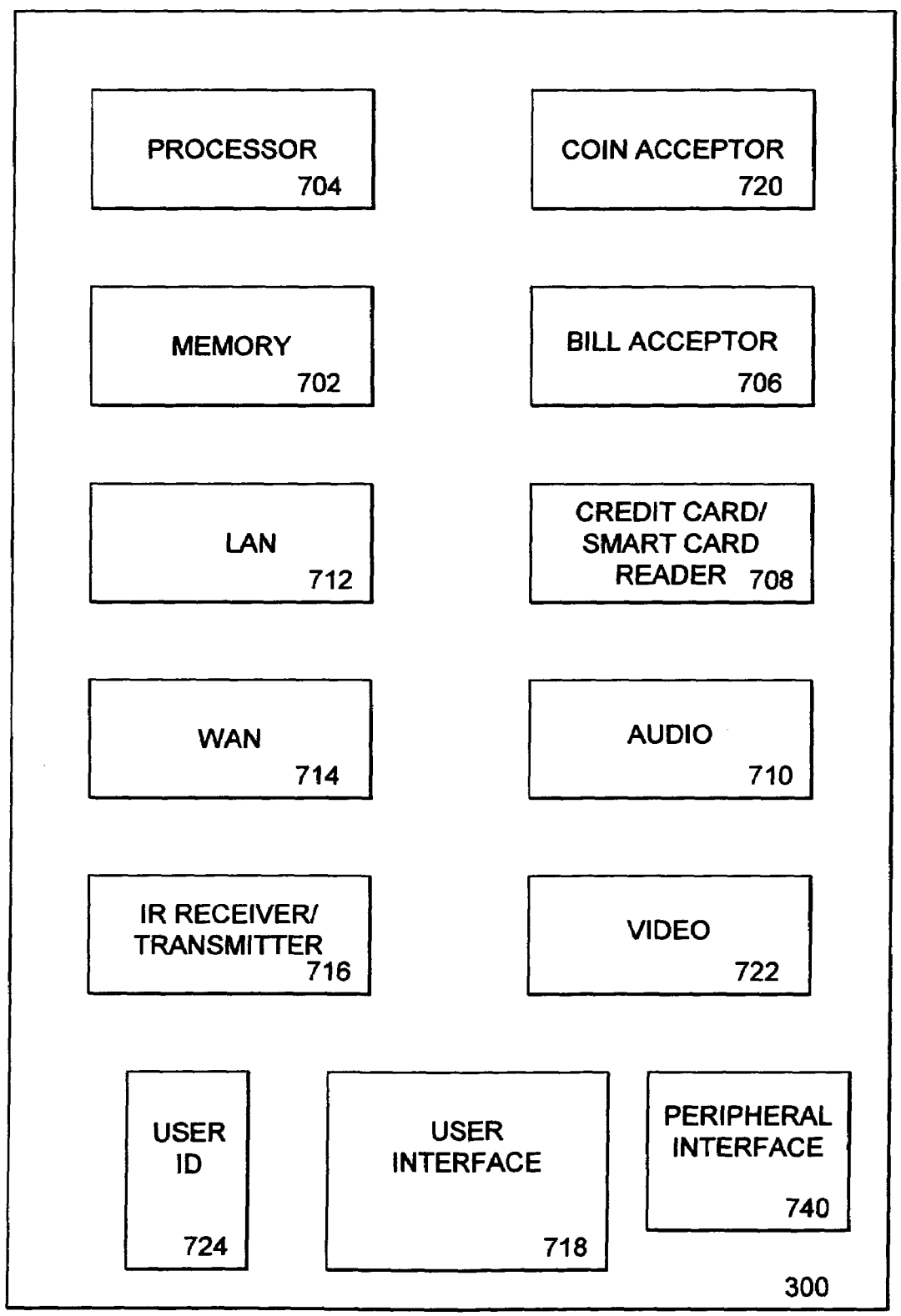
FIG. 3 is a block diagram of one embodiment of an entertainment unit.

FIG. 3 is a block diagram of an embodiment of an entertainment unit 300. Entertainment unit 300 includes memory 702 which comprises a hard disc and random access memory (RAM). In one embodiment, the hard disc stores entertainment content, such as music in digital form or games. The memory 702 also stores instructions and data for the operation of the entertainment unit 300. A user of the entertainment unit 300 interacts with the user interface 718, which includes a display screen and multiple GUIs pertaining to various functions of the entertainment unit 300. The user interacts with the user interface 718 through a user input device (not shown). The user input device may be any known input device such as a keyboard, a mouse, or voice activation. In some embodiments, user interface 718 comprises a touch screen that is the user input device.

Music may be selected with the user interface 718. The user has access through the user interface 718 to any music in a very large selection of music stored at the central management resource. Music may be selected from a list of albums. If an album is selected, the songs on the album are displayed with the album art. The user may also search for particular music by artist, song title, album title, genre, or year. Music selected by the user may be played from RAM if it is stored on memory 702. Music may also be played from the central management resource 102 through the WAN. Other embodiments may have one or more digital storage devices of various types to store entertainment content (such as music and games), operating instructions and data.

The user may use the interface 718 to select from a variety of games to be played on the entertainment unit. The available games include 2D and 3D action games, card games, trivia games, and any other electronic games. The user may choose to compete in networked games or one-on-one prize tournaments.

LAN interface 712 is the interface through which other entertainment units in a venue are connected to the entertainment unit 300. WAN interface 714 is the interface through which the venue containing the entertainment unit 300 communicates with central management resource 102. In some embodiments, the entertainment unit is further coupled to a data port separate from the WAN (not shown) so that a user may connect, for example, a laptop computer while accessing the functionality of the entertainment unit at the same time. The WAN connection may also serve as a data port. Infrared (IR) remote unit 716 includes an IR transceiver for allowing remote control of functions such as volume control. The IR unit 716 further allows communication and exchange of data between mobile devices and the entertainment unit 300. For example, music may be transferred to a mobile storage and playback device such as a motion picture experts group (MPEG)-1 audio layer 3 (MP3) player. The IR unit 716 also enables data to be exchanged between a personal data assistant (PDA) device and entertainment unit 300. In other embodiments, the entertainment unit 300 also includes a radio frequency (RF) wireless module for wireless communication as described with reference to the IR unit 716. The RF module may be in place of or in addition to the IR unit 716.

The entertainment unit 300 includes a variety of payment devices. Coin acceptor 720 includes a mechanism to accept and recognize payment in the form of coins. Bill acceptor 706 includes a mechanism to accept and recognize payment in the form of bills. Credit card/smart card reader 708 includes hardware and software for accepting and recognizing a credit card or smart card for payment. Audio unit 710 includes audio hardware and software for playing music. In one embodiment, audio unit 710 includes speakers. In another embodiment, audio unit 710 is connected to speakers which are remote from the entertainment unit 300. Video unit 722 includes hardware and software for capturing and processing images. In one embodiment, the scene inside the venue is captured with the video unit 722. For a fee, a user may view the scenes in various other venues (that have similar entertainment units) on a display screen of the user interface 718.

User interface 718 includes a graphical user interface that allows the user to interact with and control the entertainment unit 300. The user interface 718 includes a display screen. When the entertainment unit 300 is not in use, the display screen displays various moving images. In one embodiment, an "attract loop" is displayed. The attract loop shows the activities that the user may access on the entertainment unit 300. The attract loop also shows advertisements. In one embodiment, the user interacts with the user interface 718 through a touch screen. In other embodiments, the user interacts with the entertainment unit 300 through a user input device including, but not limited to, a keyboard, mouse, trackball, joystick or IR remote control. In yet other embodiments the user interacts with the user interface 718 using voice commands received by audio unit 710. Processor 704 executes instructions stored on memory 702 to control the operation of the entertainment unit 300. Optionally, the entertainment unit 300 may include a radio receiver (not shown).

The entertainment unit 300 further includes a user identification (ID) device 724 that includes hardware and software for identifying a user. In one embodiment, the user initially establishes an ID and password to access functionality of the entertainment unit 300, including stored user preferences and user payment information. The user ID may be a manually entered alpha-numeric ID, a thumbprint, or facial characteristics. Facial recognition technology and thumbprint recognition technology are known.

Figure 4:
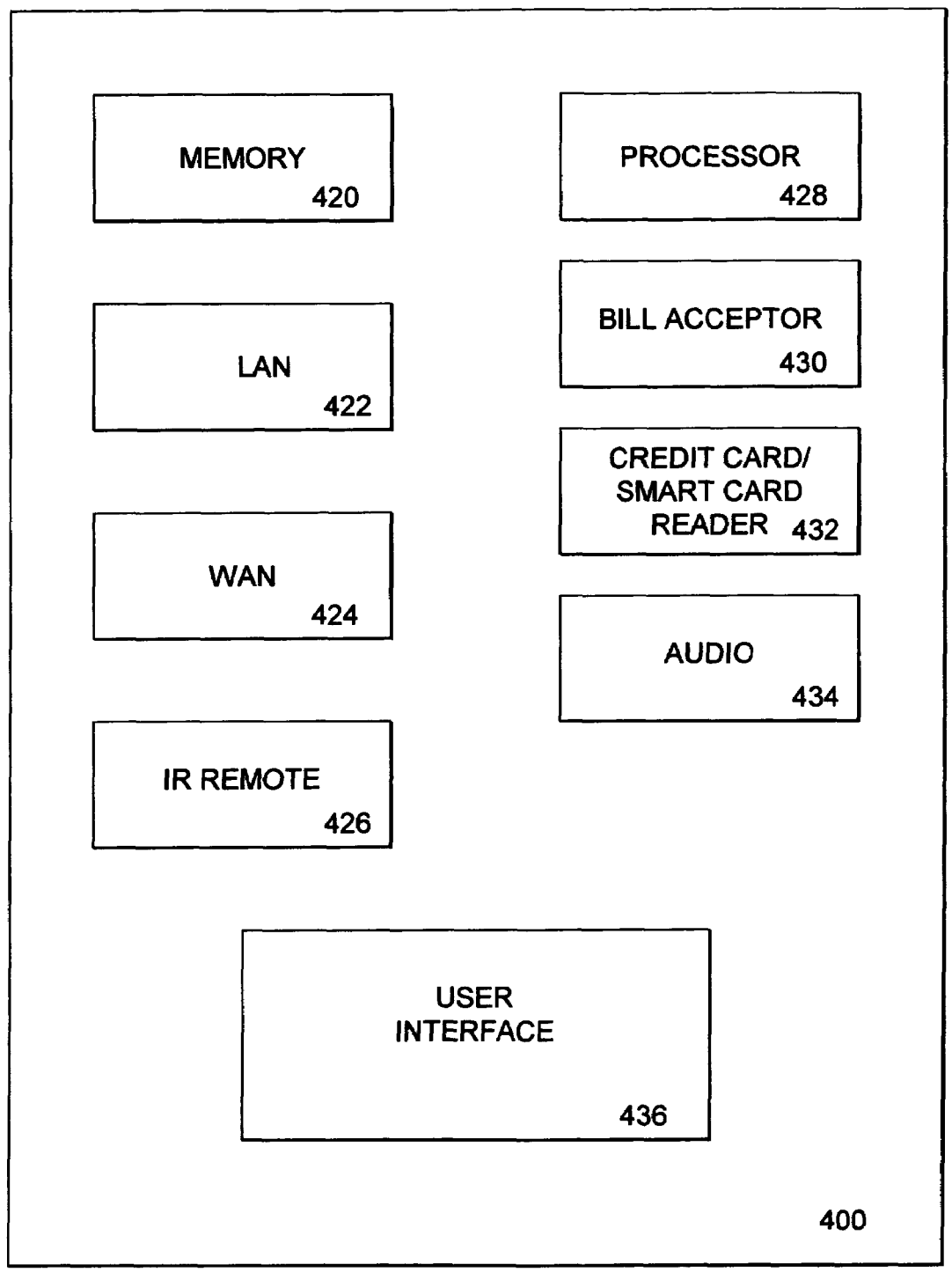
FIG. 4 is a block diagram of an embodiment of a primary entertainment unit with capabilities including playing music.
Figure 5:
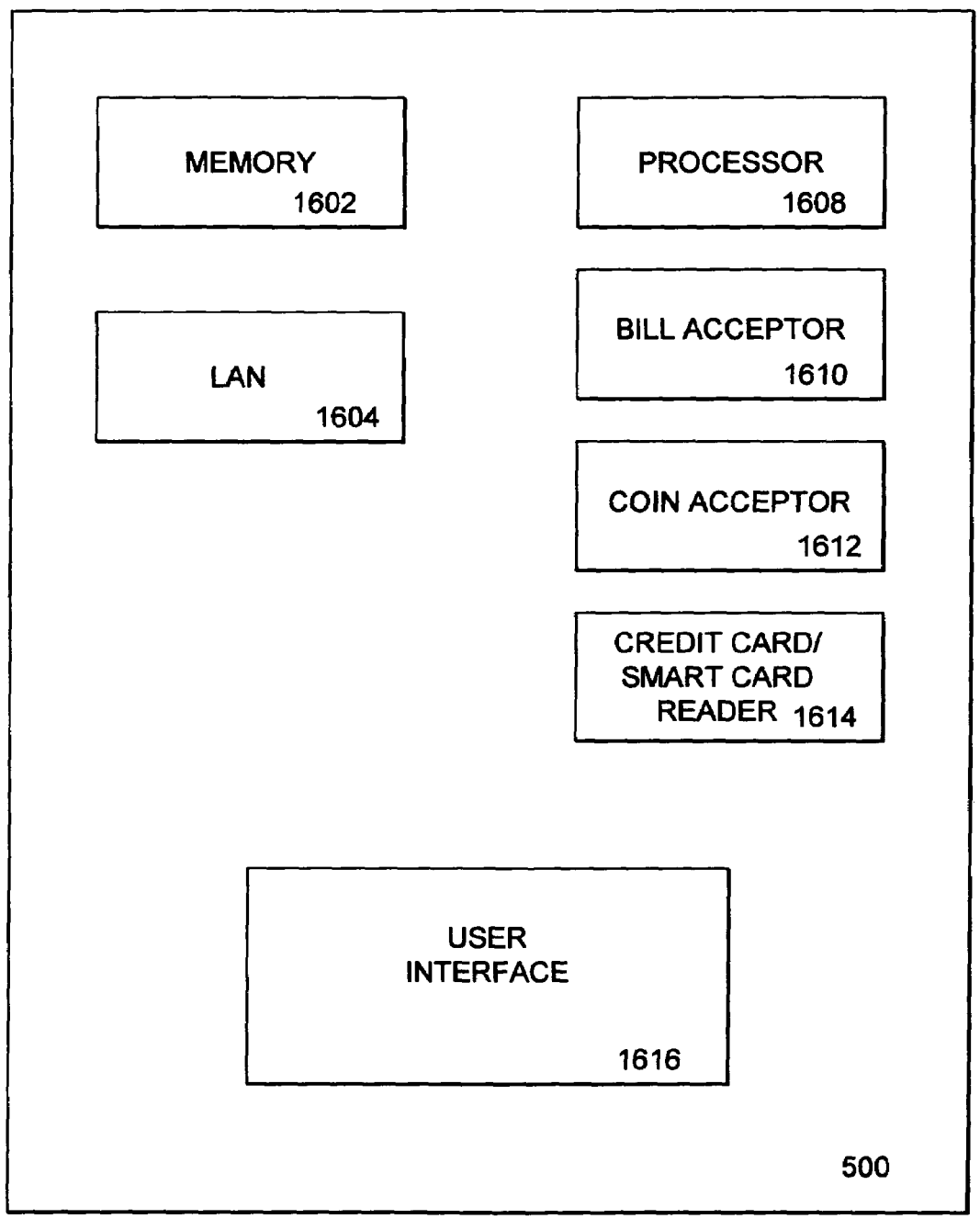
FIG. 5 is an embodiment of an embodiment of a secondary entertainment unit operating mainly as a game unit.
Figure 6:
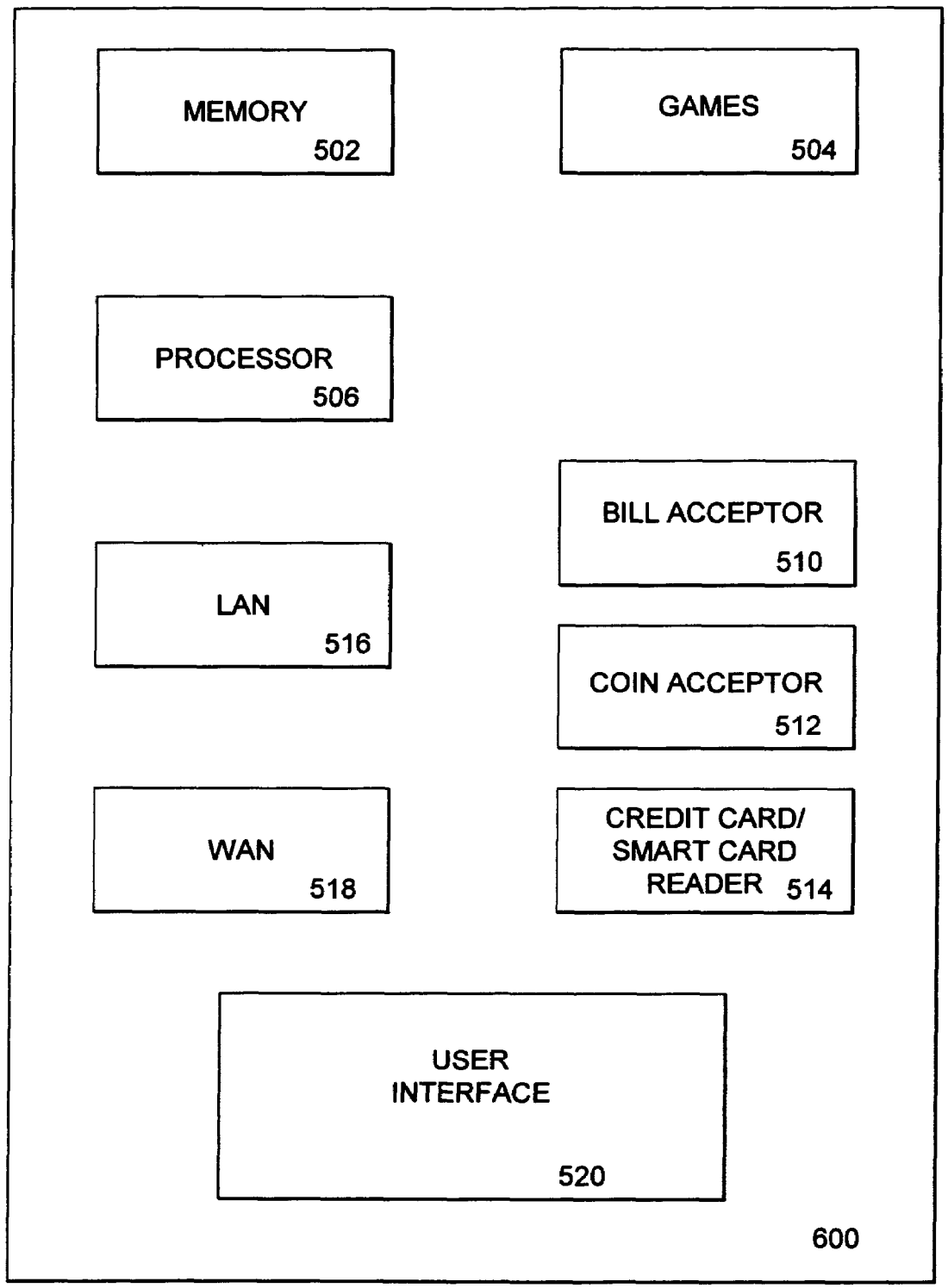
FIG. 6 is a block diagram of an embodiment of a primary entertainment unit operating mainly as a game unit.

The entertainment unit 300 may accept a variety of peripheral units to perform various functions through peripheral interface 740. Peripheral interface 740 may comprise several modules of peripheral interface hardware and software as required for a particular configuration of the entertainment unit 300. For example, the user ID module 724 and the credit card/smart card reader 708 may be peripheral modules coupled to the entertainment unit 300. Periodically, peripheral modules may be replaced to update or change the functionality of the entertainment unit 300. Additional supported peripheral devices include a video camera, an external game controller, and user recognition hardware and software for performing thumbprint recognition or facial feature recognition. In various embodiments, entertainment unit 300 may be physically configured to stand on the floor of a venue, be attached to a wall, or sit on a countertop or table In various embodiments, entertainment units in venues may have more or less functionality than the entertainment unit 300. Some entertainment units may function for the most part as music units, while others function for the most part as game units. Regardless of how an entertainment unit is configured in terms of functionality, the entertainment unit may be a primary unit, in that it communicates directly with the central management resource 102, or a secondary unit in that it communicates with the central management resource 102 through a primary unit. FIGS. 4 through 6 are block diagrams of various additional entertainment unit embodiments.

FIG. 4 is a block diagram of an embodiment of an entertainment unit 400 that is a primary entertainment unit with capabilities including playing music. Entertainment unit 400 includes memory 420 which comprises a hard disc and random access memory (RAM). In one embodiment, the hard disc stores music in digital form as well as instructions and data for the operation of the entertainment unit 400. Music that has been selected to be played is played from RAM. Other embodiments could have one or more digital storage devices of various types to store entertainment content (such as music) and operating instructions and data.

LAN interface 422 is the interface through which secondary entertainment units are connected to the entertainment unit 400. WAN interface 424 is the interface through which the venue containing the entertainment unit 400 is connected to central management resource 102. Infrared (IR) remote unit 426 includes an IR transceiver for allowing remote control of functions such as volume control. Bill acceptor 430 includes a mechanism to accept and recognize payment in the form of bills. Credit card/smart card reader 432 includes hardware and software for accepting and recognizing a credit card or smart card for payment. Audio unit 434 includes audio hardware and software for playing music. In one embodiment, audio unit 434 includes speakers. In another embodiment, audio unit 434 is connected to speakers which are remote from the entertainment unit 400. User interface 436 is a graphical user interface including a display screen. Processor 428 executes instructions stored on memory 420 to control the operation of the entertainment unit 400. Entertainment unit 400 may also operate as a sole entertainment unit in a venue.

FIG. 5 is a block diagram of an embodiment of an entertainment unit 500 that is a secondary unit operating primarily as a game unit. Entertainment unit 500 includes memory 1602, bill acceptor 1610, coin acceptor 1612, and credit card/smart card reader 1614. Memory 1602 stores instruction and data used by processor 1608 to control the operation of the entertainment unit 500. Memory 1602 memory comprises a hard disc and random access memory (RAM). In one embodiment, the hard disc stores games in digital form as well as instructions and data for the operation of the entertainment unit 500. Other embodiments may have one or more digital storage devices of various types to store entertainment content (such as games) and operating instructions and data.

LAN interface 1604 connects the entertainment unit 500 to a primary entertainment unit such as the entertainment unit 400. User interface 1616 has a graphical user interface with which the user interacts to control the entertainment unit 500. In one embodiment, the user inserts payment into the entertainment unit 500 through either bill acceptor 1610, coin acceptor 1612, or credit card/smart card reader 1614 before the user may choose a game to play as displayed on user interface 1616. In one embodiment, user interface 1616 includes a touch display screen and allows the user to browse the Internet with or without payment. User interface 1616 "plays" an attract loop as described with reference to FIG. 3. The user interface 1616 prompts the user to enter commands through an input device which may be a touch screen, a keyboard, or other input device depending upon the embodiment. In some embodiments, the entertainment unit 500 includes an audio receiver (not shown) and voice processing hardware and software (not shown) to accept voice commands. Optionally, the entertainment unit 500 may include a radio receiver (not shown).

FIG. 6 is a block diagram of an entertainment unit 600 that is a primary unit operating mainly as a game unit. The entertainment unit 600 includes a WAN interface 518 which supports direct communication with the central management resource 102. Other elements of the entertainment unit 600 such as memory 502, game 504, processor 506, LAN interface 516, bill acceptor 510, coin acceptor 512, credit card/smart card reader 514, and user interface 520 function similarly to their like-named counterparts as shown in FIG. 5. Entertainment unit 600 may also operate as a sole entertainment unit in a venue.

Figure 7:
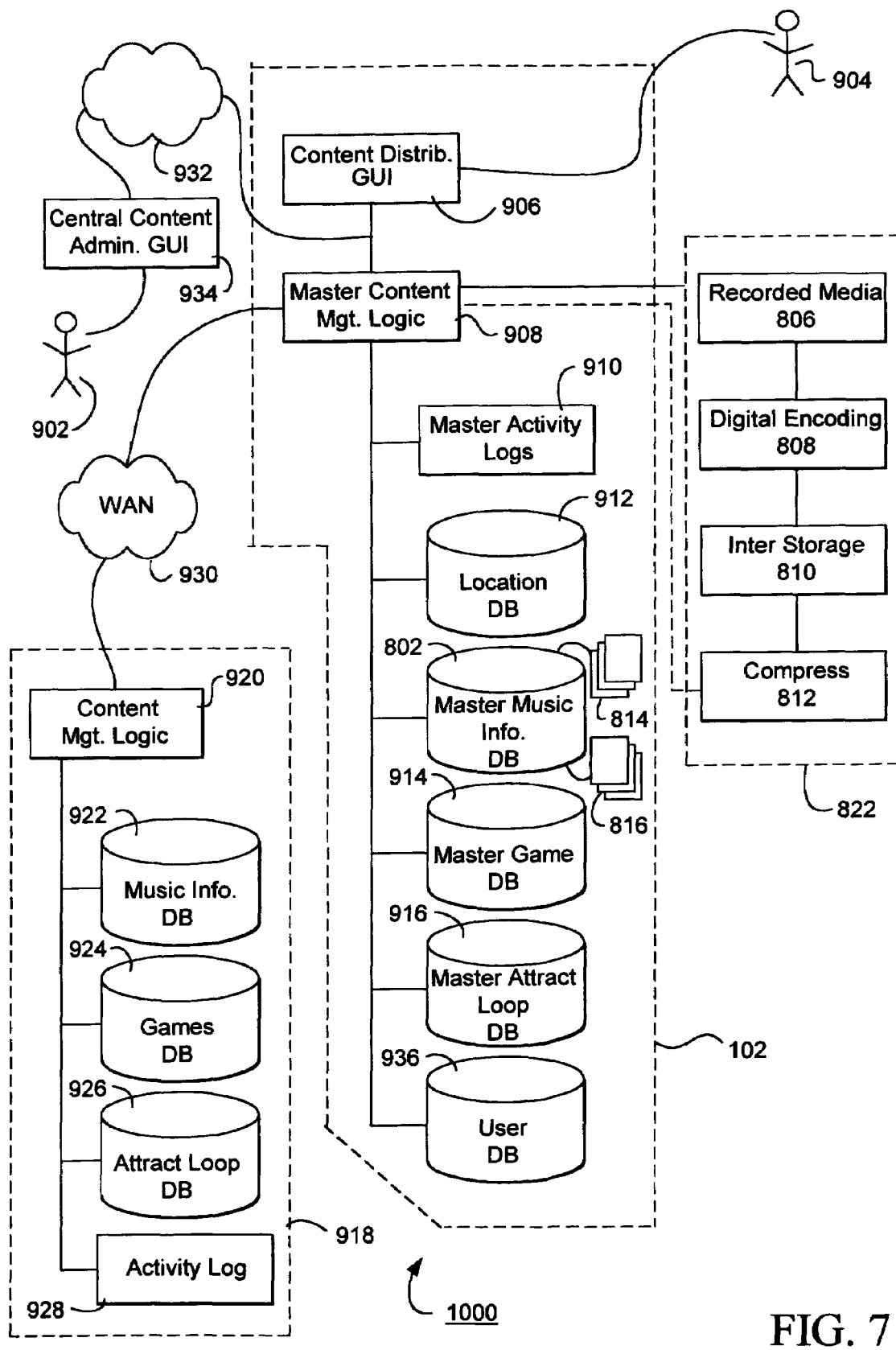
FIG. 7 is a block diagram showing software and hardware elements of an embodiment of a distributed entertainment system.

FIG. 7 is a block diagram showing an embodiment of a distributed entertainment system 1000. Central resource 102, generic venue 918, and content processing module 822 that includes content processing hardware and software are shown. The elements shown in generic venue 918 may reside on one or more entertainment units. Central content administration GUI 934 communicates with central management resource 102 through network 932 which may be a WAN or a LAN. Administrator 904 interacts with content distribution GUI 906. Content distribution GUI 906 in conjunction with master content management logic 908 controls content administration and distribution to venues connected to central management resource 102. Master content management logic 908 interacts with master activity log 910, location database 912, master music information database 802, master game database 914, master attract loop database 916, and user database 936. Master activity log 910 includes information gathered from various entertainment units about content usage by an entertainment unit or by a venue. Location database 912 stores information about specific venues. Master music information database 802 stores a master list of available music. Music files storage 814 and album art files storage 816 store music and album art, respectively, in electronic form. In other embodiments, the master music information database 802 stores the music and the album art in electronic form, as well as the master list of available music. Master game database 914, in one embodiment, stores information about available games and the available games themselves. In another embodiment, master game database 914 stores information about games while the games themselves are stored in another location on central management resource 102. Master attract loop database 916 stores various attract loops employed at different venues. Attract loop content includes audio and video content that shows a user what activities can be accessed on a unit. Attract loop content also includes advertising. The user database 936 includes information relating to previously established user accounts.

Generic venue 918 communicates with central management resource 102 through WAN 930. Content management logic 920 communicates with master content management logic 908. Music information database 922 stores essentially the same information as master music information database 922. That is, a user at a local venue will see every song title available from central management resource 102. Games database 924, in one embodiment, stores information about games as well as the games available at venue 918. In another embodiment, games database 924 includes information about games and the games available from central management resource 102. Music information database 922 and games database 924 may be available on a single unit in a venue or may be available separately on different units in any venue. Attract loop database 926 includes attract loops played at the units in venue 918. Activity log 928 stores activity information such as game and music usage information, fee information etc., for venue 918.

Administrator 902 interacts with the central content administration GUI 934. In some embodiments, central content administration GUI 934 is resident on central management resource 102. This is also true of content processing hardware and software 822, which is shown to be remote from the central management resource 102, but in other embodiments, could be in the same location as central management resource 102. In one embodiment, central content administration GUI 934, master music information database 802, master content management logic 908, music files storage 814 and album art files storage 816 reside on central management resource 102. The content administration GUI 934 allows the administrator 902 to manage content in the system 1000.

The content processing module 822 includes content processing hardware and software are shown. Recorded media 806 is music recorded in an electronic format on some medium such as compact disc, magnetic tape, or gramophone records. The information on recorded media 806 is digitally encoded via digital encoding hardware and software 808 to produce digitally encoded music data. The digitally encoded music data is placed in an intermediate storage 810. From the intermediate storage 810, the digitally encoded music data is transferred to master content management logic 908. The music data includes music identifying information, music files, and album art. Music files are stored in music file storage 814 and album art files are stored in album art storage 816. Master music information database 802 stores a master list of all the music represented by the music files and the album art files. In other embodiments, the music files, album art files and music information may be stored together, for example on master music information database 802.

In one embodiment, digitally encoded music data is transferred from intermediate storage 810 to compression hardware and software 812 where it is compressed and then transferred to master content management logic 820 in compressed form. The master content management logic may store initially compressed music information data in master music information database 802, music file storage 814, and album art storage 816. The master content logic also transfers music files and album art files from music file storage 814 and album art storage 816 to venue 918 when requested.

Figure 8:
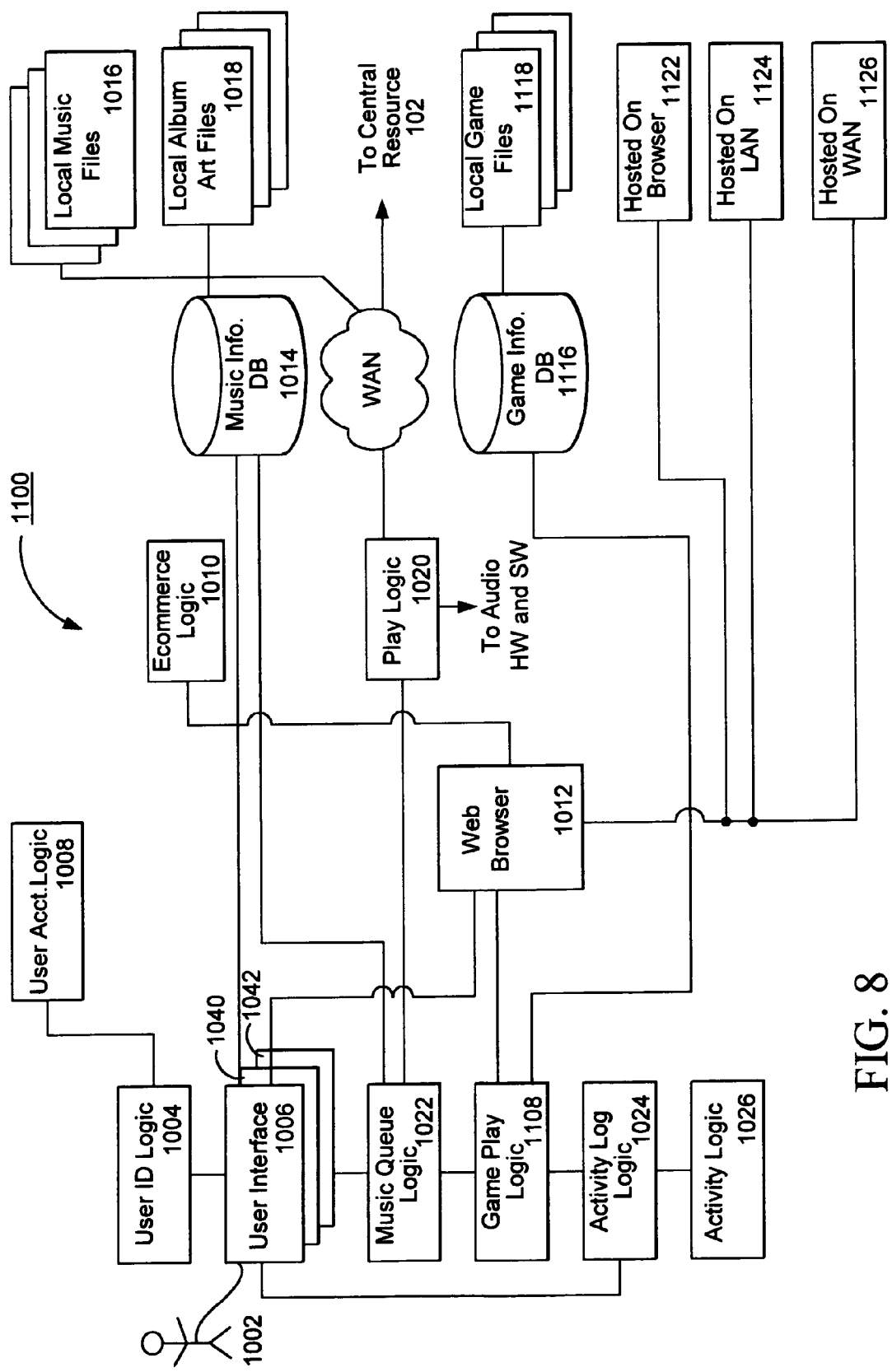
FIG. 8 is a block diagram showing software and hardware elements of an embodiment of an entertainment unit.

FIG. 8 is a block diagram of an embodiment of an entertainment unit 1100. User 1002 interacts with user interface 1006. Through the user interface 1006, the user may access a music selection GUI 1040 and game selection GUI 1042, and the web browser 1012. In some embodiments, the user interface 1006 also allows the user to order food, beverages, or any other product or service provided by the venue. In one embodiment, user ID logic 1004 queries the user for ID information, which may be input by using a keyboard or a touchscreen, by providing a thumbprint, or by allowing a photograph of the user's face to be taken. If the user has previously submitted data (such as ID number, thumbprint or facial image) that data is stored along with charge account data for the user. Stored data is compared with currently collected data. If the comparison yields a match, the user is successfully identified and any stored information about the user may be accessed to make the interaction with the entertainment unit faster and more enjoyable. For example, the user may have account information stored that allows the entertainment unit to automatically debit a user account for any charges incurred by the user in the venue using user account logic 1008. The user may also store preferences, such as game and music preferences. The user may also store data that the user wishes to see automatically displayed on the web browser, such as certain news reports and stock quotes.

If the user does not have account or preference information stored, the user interface 1006 queries the user whether the user wishes to establish an identity and an account by allowing collection and storage of the necessary identification and charge account data by user ID logic 1004. When the user inputs an indication of the user's identity (for example, alphanumeric ID, thumbprint, or facial image), the input is converted to an electronic form that becomes the user ID associated with the user's charge account information in the user account logic 1008.

The user 1002 may view the music selection GUI 1040 to browse all of the music available on the central management resource 102. All of the available music is listed in the music information database 1014. As the user 1002 selects music listed in music information database 1014 and displayed by music selector GUI 1040, the user 1002 may choose to purchase a music selection. When the user 1002 chooses to purchase a music selection, web browsing 1012 is automatically invoked, and the user 1002 is taken to a web site where the selected music can be purchased using e-commerce logic 1010. The user may download a purchased music selection to a portable storage and play device, such as an MP3 player.

The user may also select music to be played in the venue. If a selected music or album art is not among local music files 1016 and local album art files 1018, the requested items are fetched from the central management resource 102 transparently to the user 1002.

Music information database 1014 contains pointers to music files and album art files stored in music files storage 1016 and album art storage 1018. Music queue logic 1022 and music play logic 1020 queue and play music selected by the user 1002. The selected music is forwarded by play logic 1020 to audio hardware and software such as, for example, a decoder, a digital to analog converter, and an amplifier.

Activity logic 1024 and activity log 1026 process and store information about activities occurring on the entertainment unit 110 such as, for example, purchase data and usage statistics of all kinds.

Through the user interface 1040, the user 1002 may also access the game selection GUI 1042. The game selector GUI 1042 allows the user 1002 to select games from game information database 1116. Game playing logic 1108 accesses local game files 1118 to play games selected by the user 1102. The user 1002, through game selector GUI 1042, may local games or network games such as tournament games. Game playing logic 1108, through web browser 1020, accesses network games including network games 1122 hosted on another browser in the venue, games 1124 hosted on another entertainment unit through a LAN in the venue, or games 1126 hosted on the WAN.

Entertainment unit 1100 is an exemplary configuration with exemplary functionality. In other embodiments, the entertainment unit may have more or less functionality. For example, the entertainment unit may have only music capability or only game capability. In addition, the entertainment unit may have video capability allowing the user to broadcast video of the venue and view live video from other venues.

Figure 9:
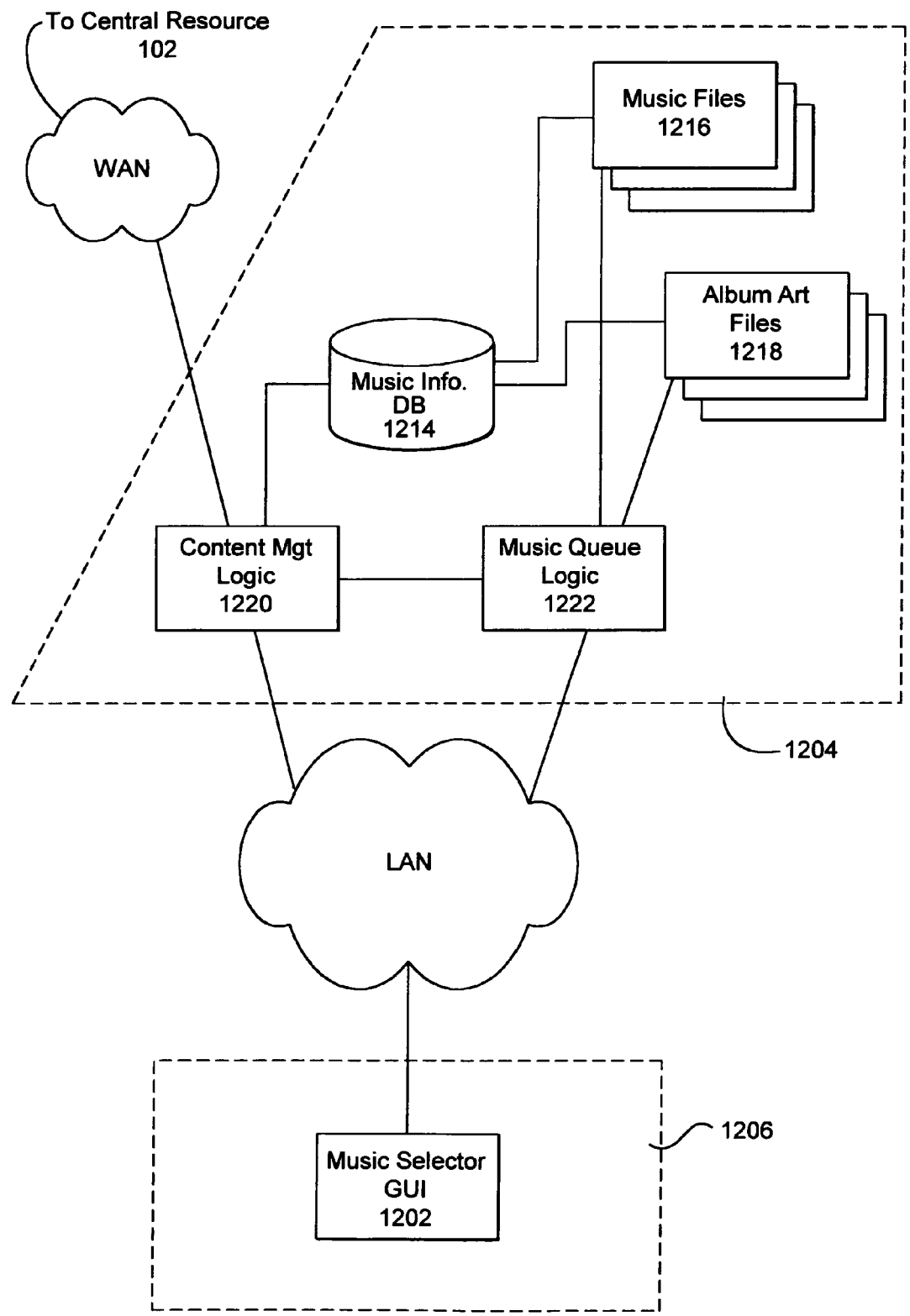
FIG. 9 is a block diagram showing hardware and software elements involved in queuing music across a network according to an embodiment.

FIG. 9 is a block diagram of hardware and software involved when a music selection is queued over a LAN in one venue in which entertainment using 1204 has resident music functionality, but entertainment unit 1206 does not. Entertainment unit 1204 is coupled to central management resource 102 through the WAN and to the entertainment unit 1206 through the LAN. When a user selects music from the music selector GUI 1202 on the entertainment unit 1206, the request is sent to content management logic 1220 on the entertainment unit 1204. Content management logic 1220 is connected to music information database 1214 also to music queue logic 1222. If the music file storage 1216 includes the selected song, the selected song will be queued by music queue logic 1222 to be played on the entertainment unit 1204. If the music file storage 1216 does not include the selected song, content management logic 1220 will communicate to central management resource 120 through the WAN in order to queue the selected song from the central management resource 120.

In one embodiment, when a music selection is queued over the WAN it is first transmitted and locally stored in the venue to be played. In another embodiment, the queued music selection is streamed over the WAN to be played real-time at the venue.

Figure 10:
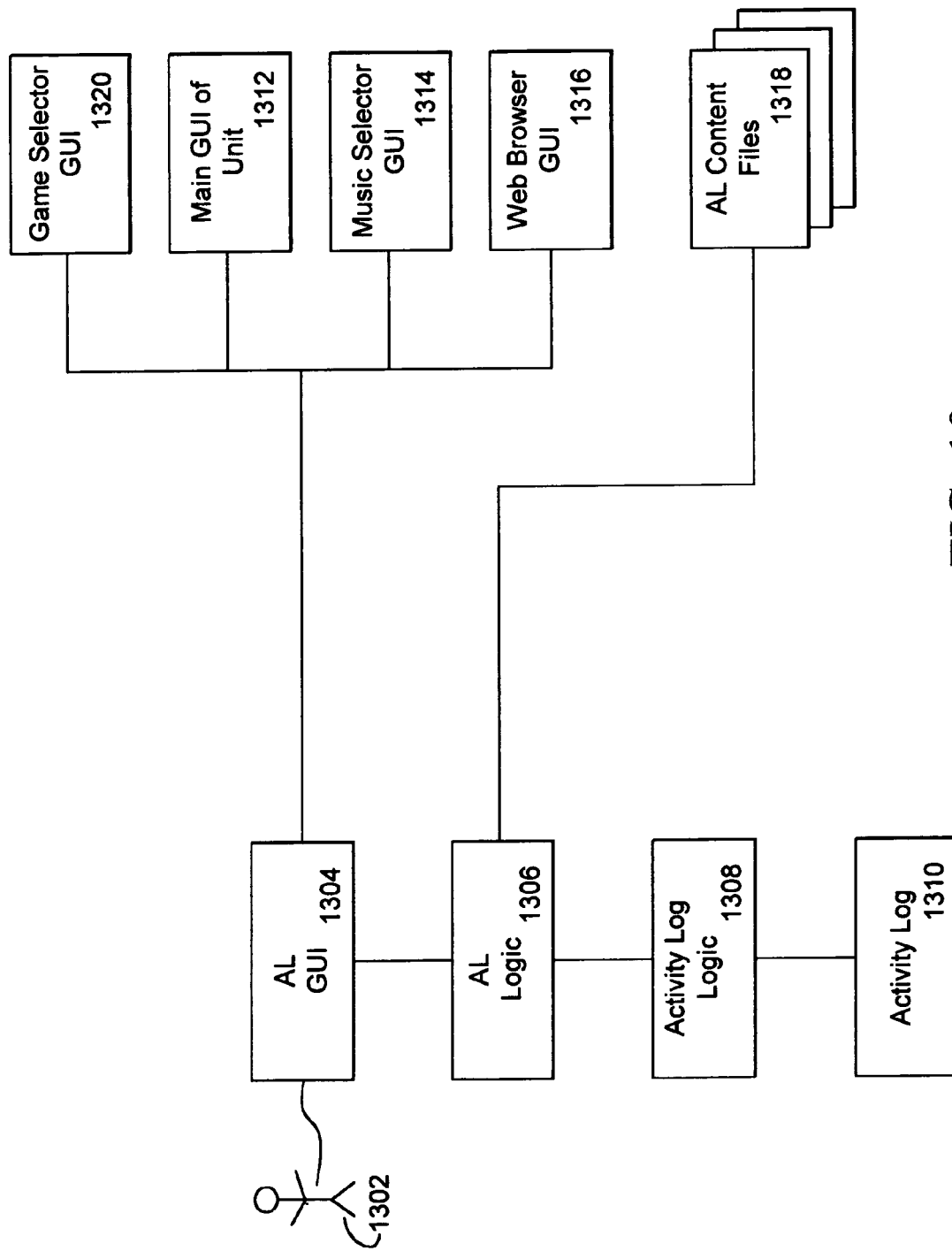
FIG. 10 is a block diagram showing elements of an embodiment of an attract loop.

FIG. 10 is a block diagram of hardware and software involved in operation of an attract loop. In one embodiment of the system, an attract loop GUI is a default GUI on any entertainment unit in a venue, regardless of the entertainment unit's range of functionality. The attract loop GUI includes moving pictures and sounds that illustrate and/or demonstrate to the user capabilities of the entertainment unit the user is viewing. The attract loop also includes advertisements. The attract loop is a continuous loop of subject matter that plays repeatedly. When the user 1302 interrupts the attract loop GUI 1304, for example by causing an input to the entertainment unit using a touch screen or mouse, the attract loop is interrupted to allow the user to view either the main GUI 1312 of the entertainment unit, the music selector GUI 1314, the web browser GUI 1316, or a game selector GUI 1320. Depending upon the functionality of the entertainment unit, some or all of the GUIs may be available.

The attract loop GUI 1304 is connected to the attract loop logic 1306 which controls the operation of the attract loop GUI 1304. The attract loop logic 1306 is connected to the attract loop content file storage 1318. The content file storage 1318 stores subject matter displayed in the attract loop, such as advertisements, available food or beverages, and activities of which a unit is capable. Activity log logic 1308 and activity log 1310 process and store activity occurring on attract loop GUI 1304. For example, activity log 1310 may store a number of times a particular advertisement is displayed. The number of times in any particular time period that a particular advertisement is displayed is usually random, in part because it is not possible to predict when a user will interrupt the attract loop. In one embodiment, the attract loop resumes after an interruption by restarting at the beginning. In another embodiment, the attract loop resumes at a random point, not necessarily the point at which it was interrupted.

Figure 11:
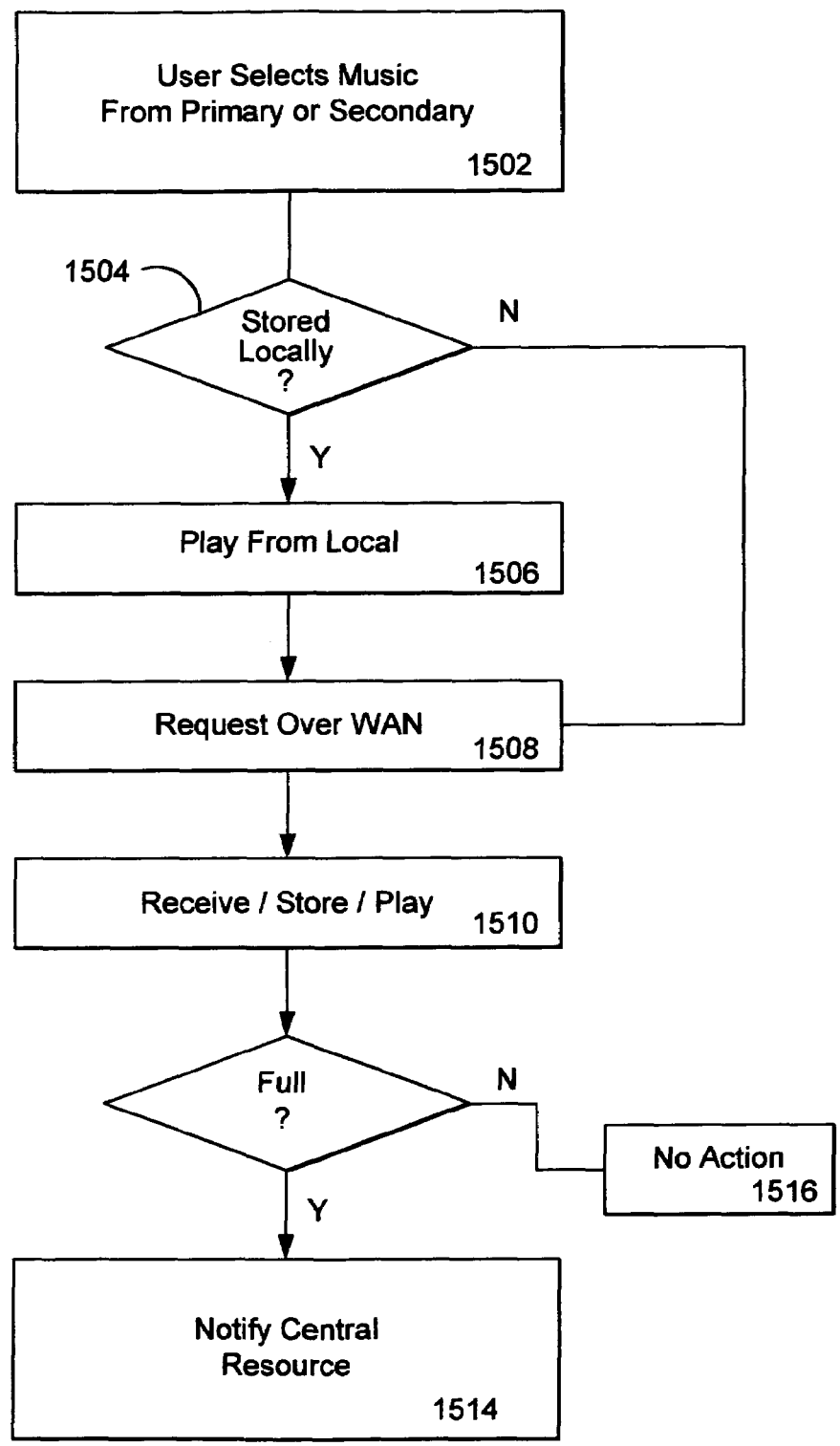
FIG. 11 is a flow diagram of an embodiment of storing music on a unit in a venue.

FIG. 11 is a flow diagram showing an embodiment of a process of storing music on a unit in a venue. A user selects music from either a primary or secondary unit in a venue at 1502. At 1504 it is determined whether the selection is stored locally (within the venue). If the selection is stored locally, it is played from the local storage at 1506. If the selection is not stored locally, a request is made over the WAN to the central management resource at 1508. The request is serviced by the central management resource and the selection is received, stored and played at the venue. It is then determined whether the local storage (for example, memory of the venue's primary unit) is full. If the local storage is full, a notification is sent to the central management resource. If the local storage is not full, no action is taken. When the local resource receives a notification that the local storage is full, music selections can still be requested over the WAN and played locally, but they cannot be stored. When an administrator receives the notification that the local storage for a venue is full, the administrator may either empty the local storage, replace the music selections in the local storage partially or completely, or reduce the number of music selections stored locally. Replacement or reduction may be done according to any rationale. Data from the relevant activity log may be used in the rationale in some embodiments.

Figure 12:
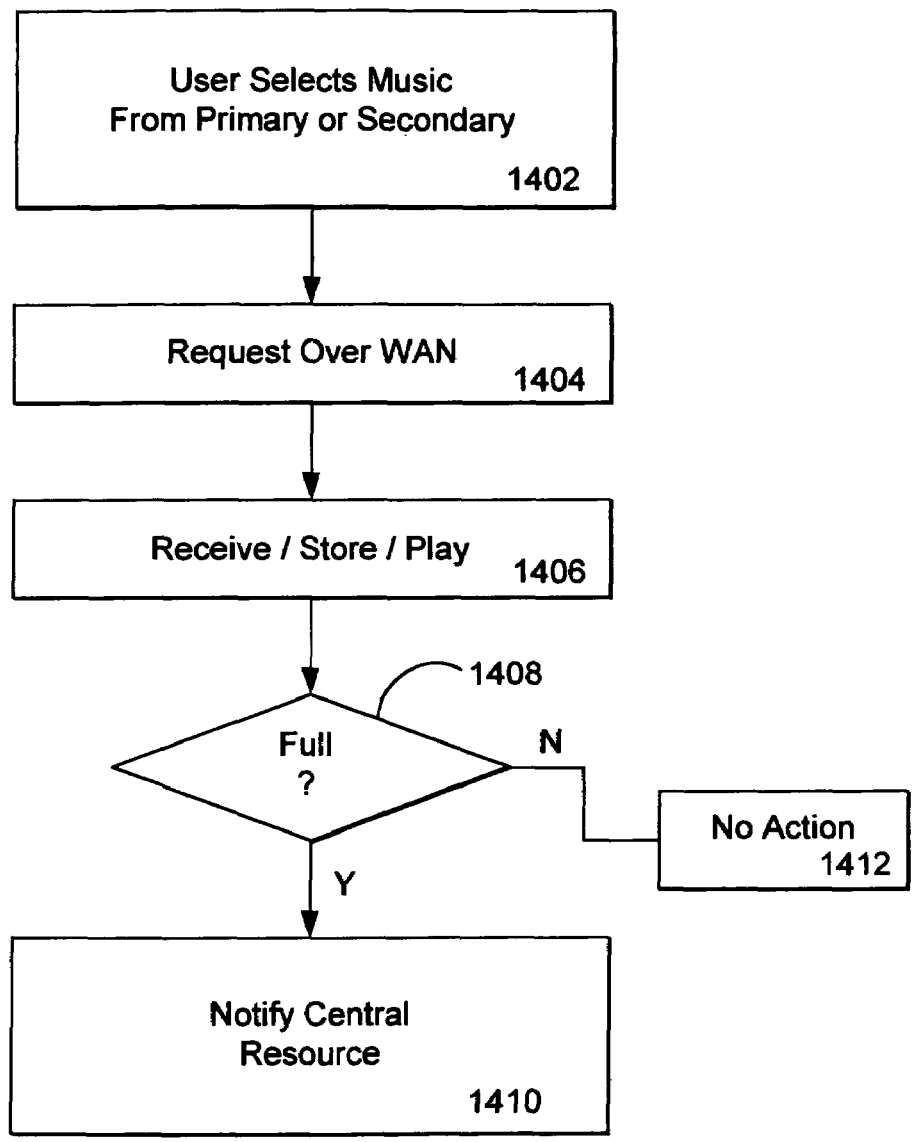
FIG. 12 is a flow diagram of another embodiment of storing music on a unit in a venue.
Figure 13:
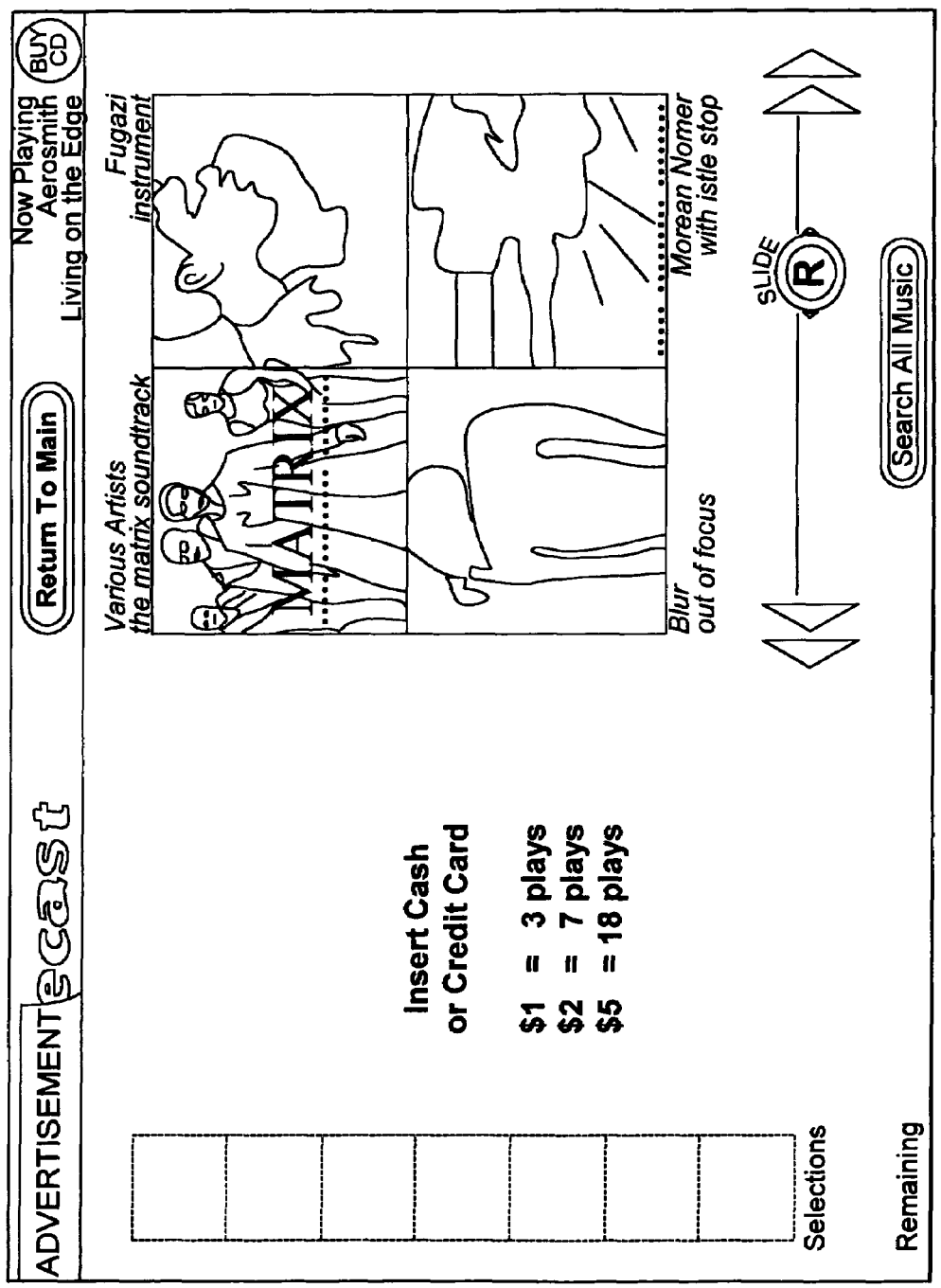
Figure 14:
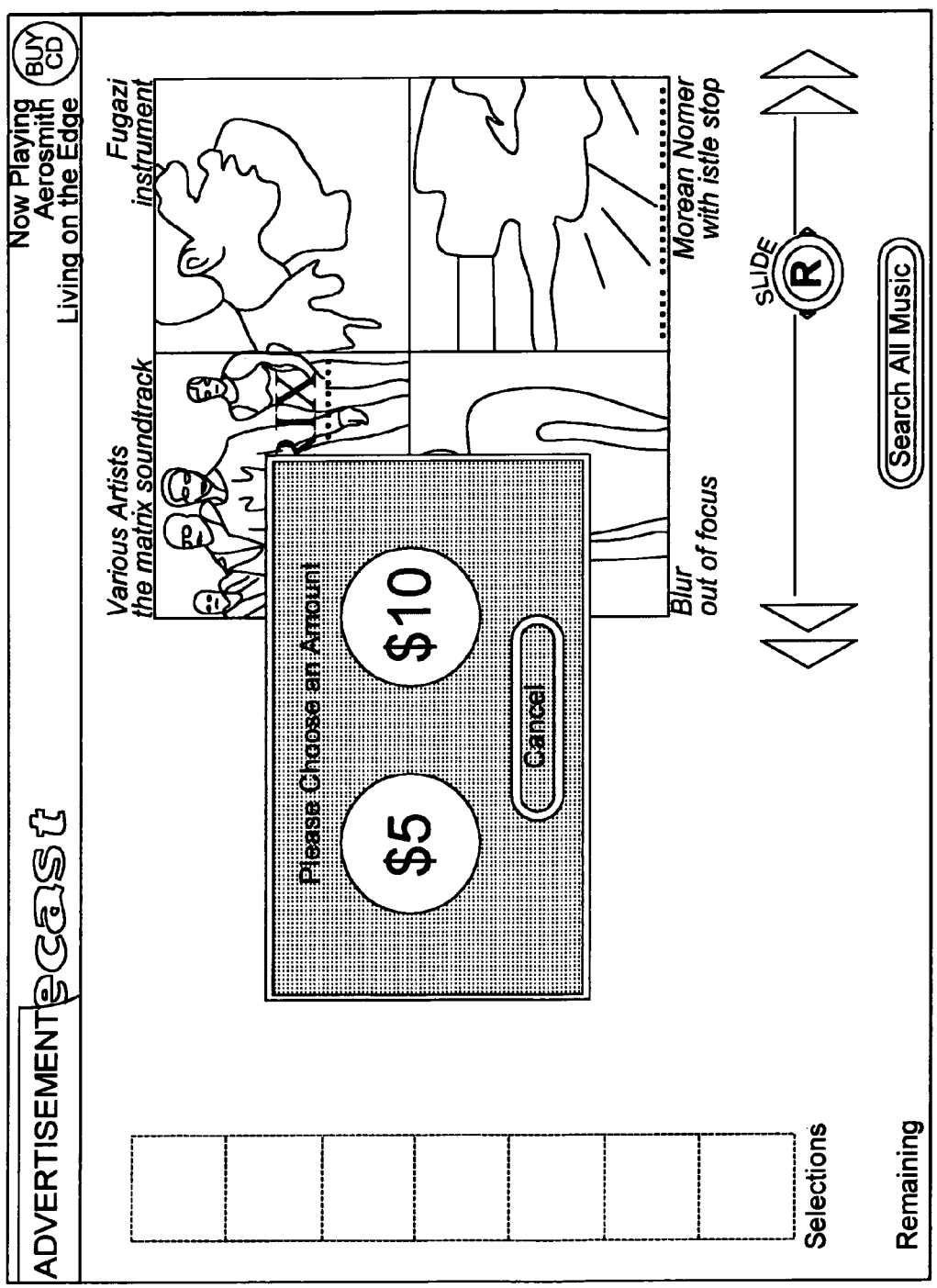
Figure 15:
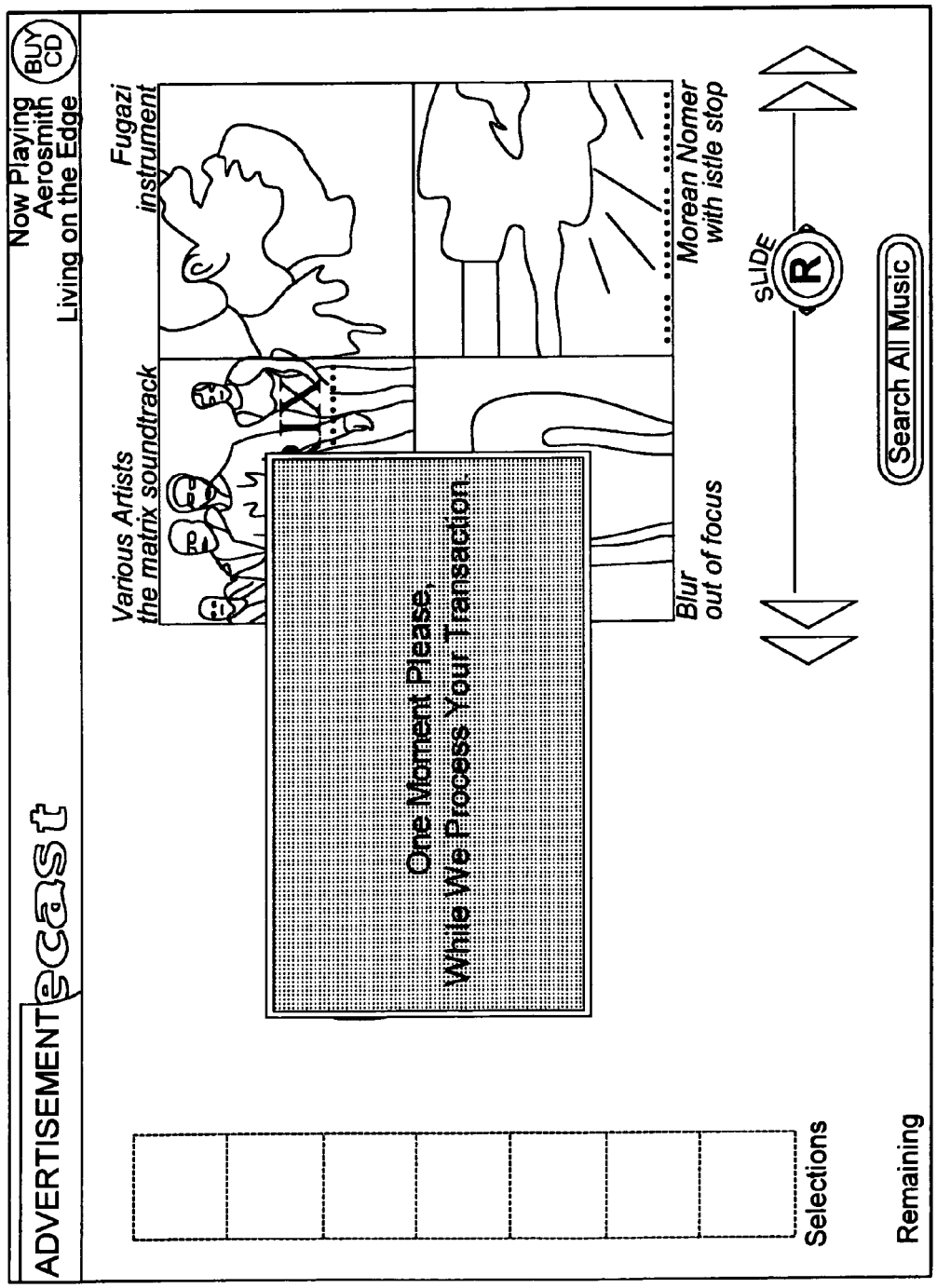
Figure 16:
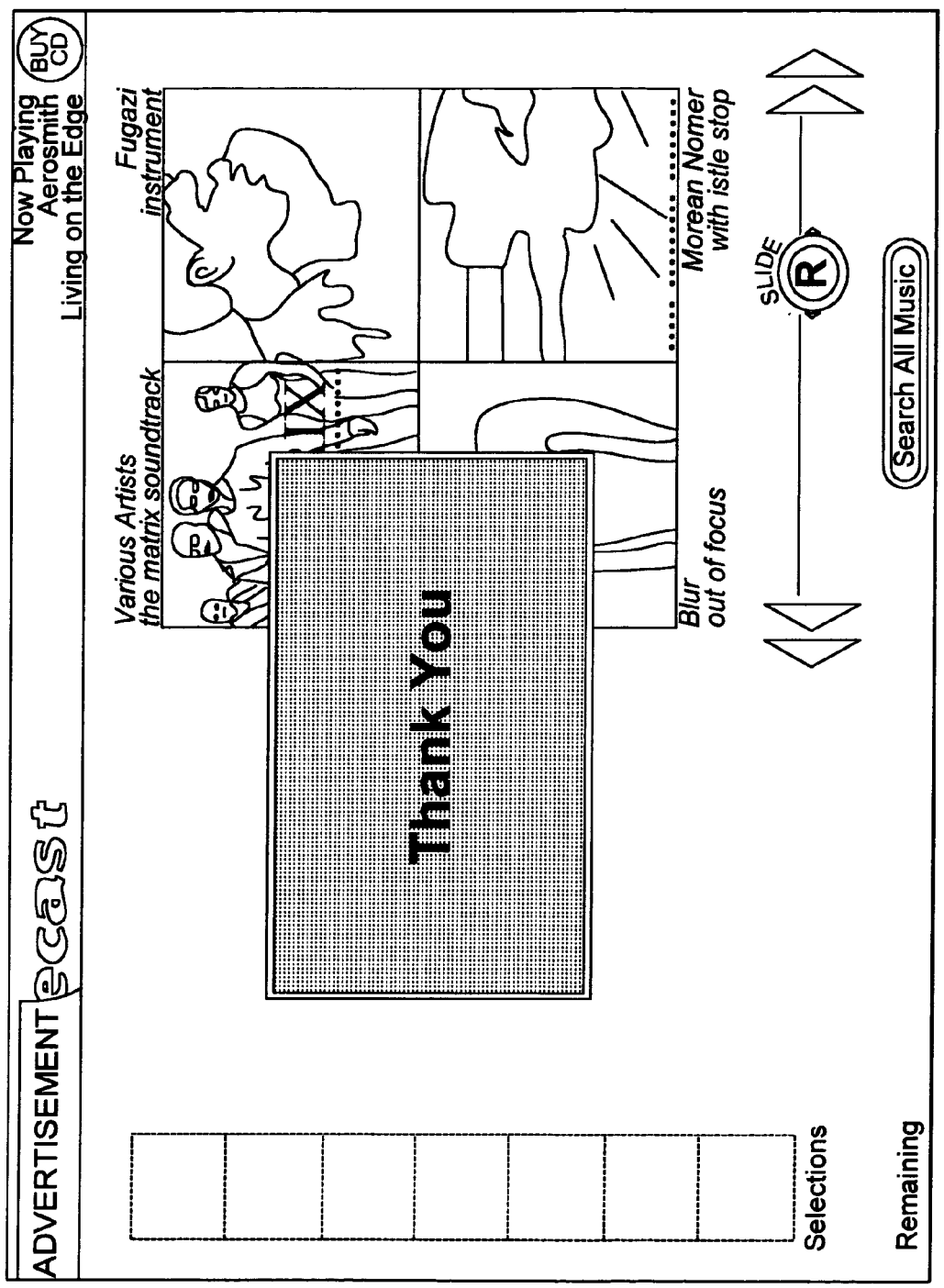
Figure 17:
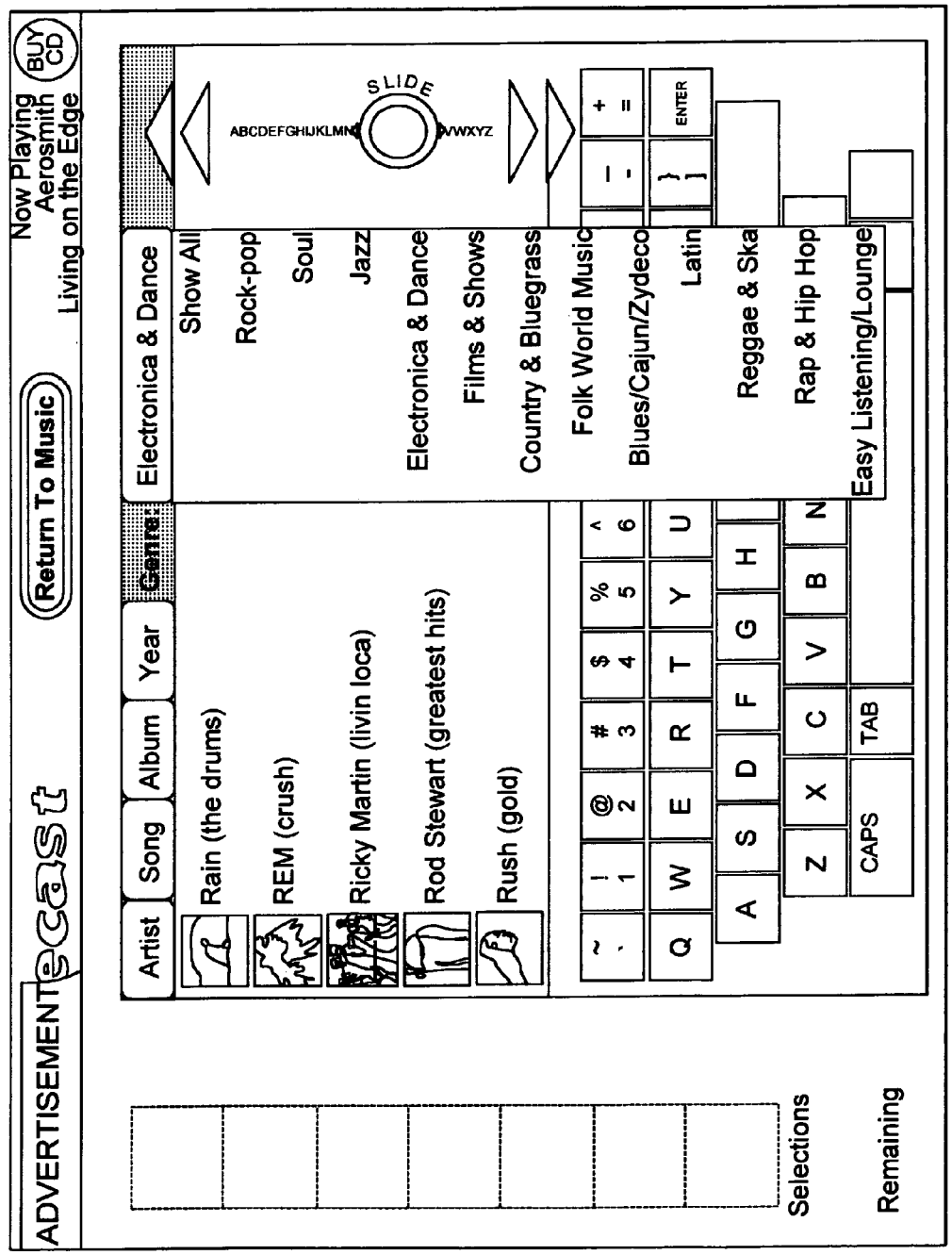
Figure 18:
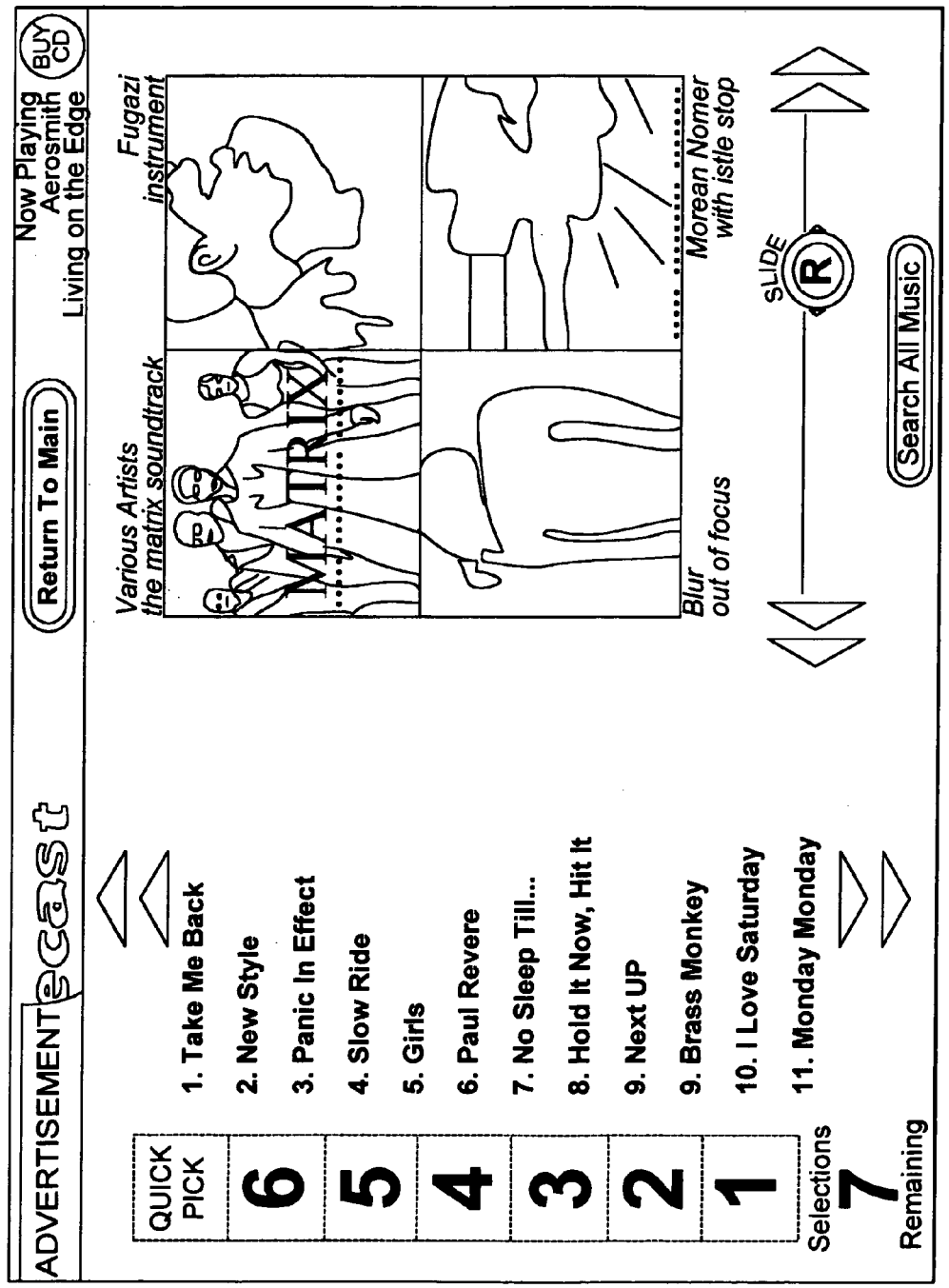
Figure 19:
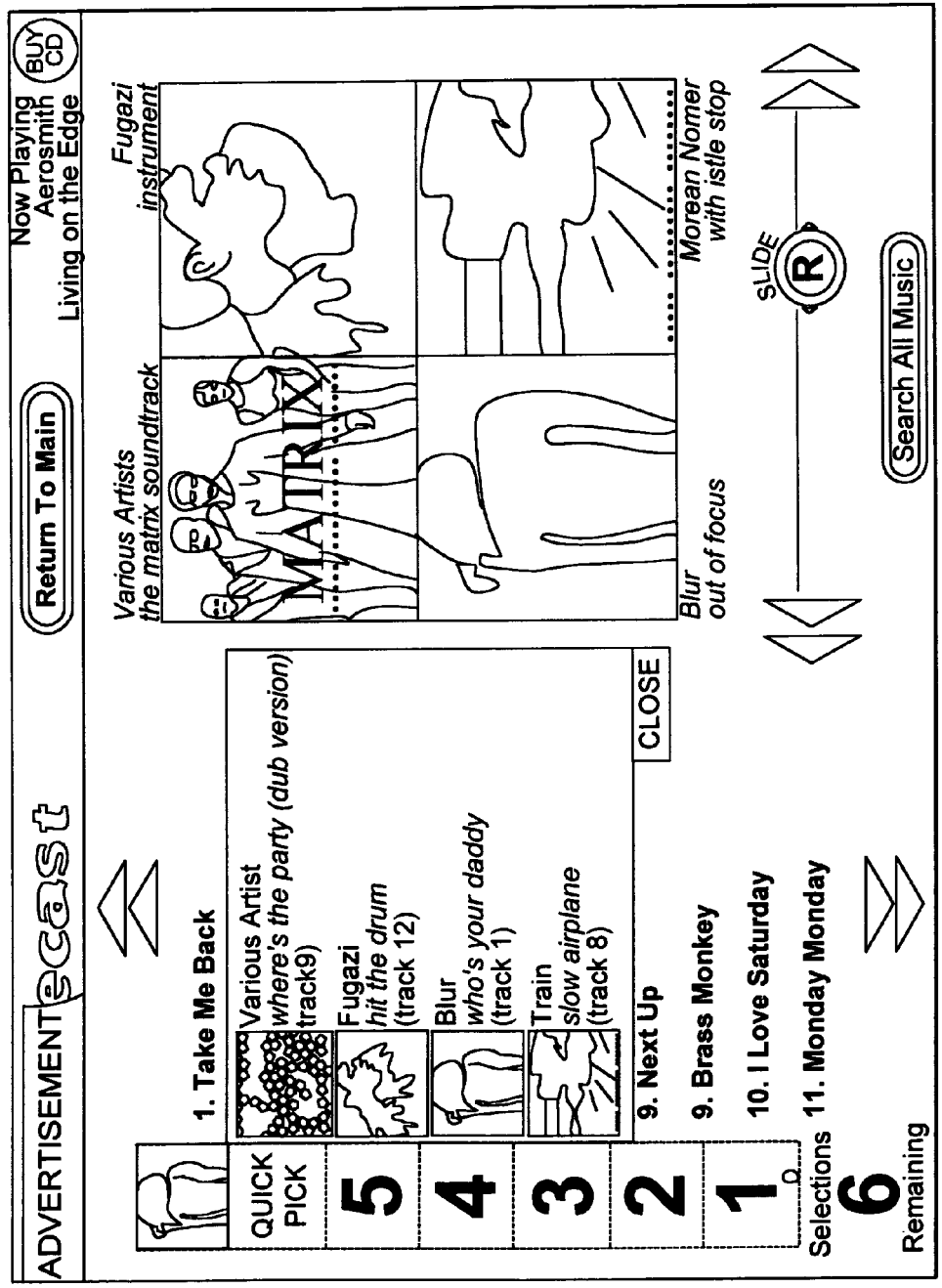
Figure 20:
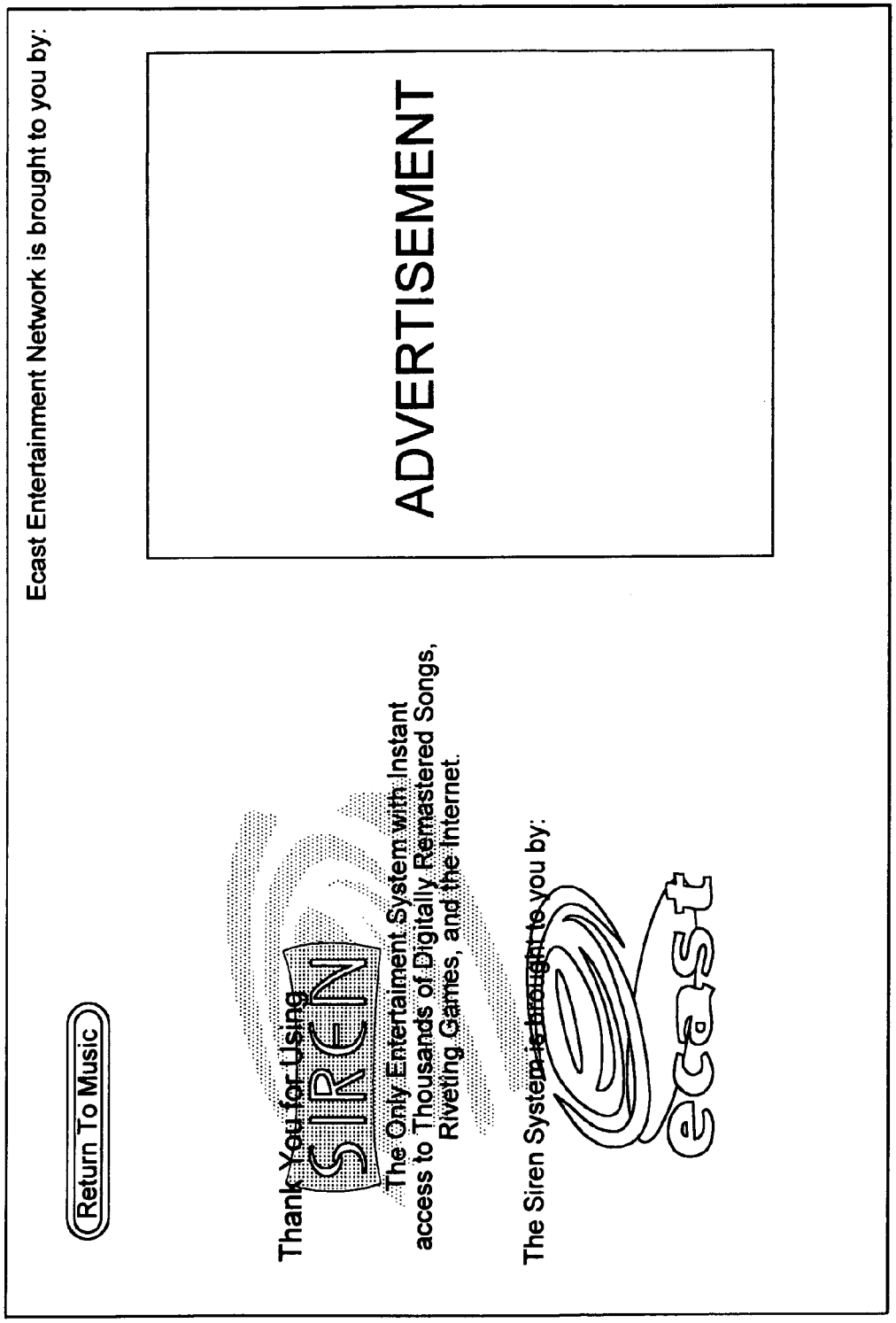
Figure 22:
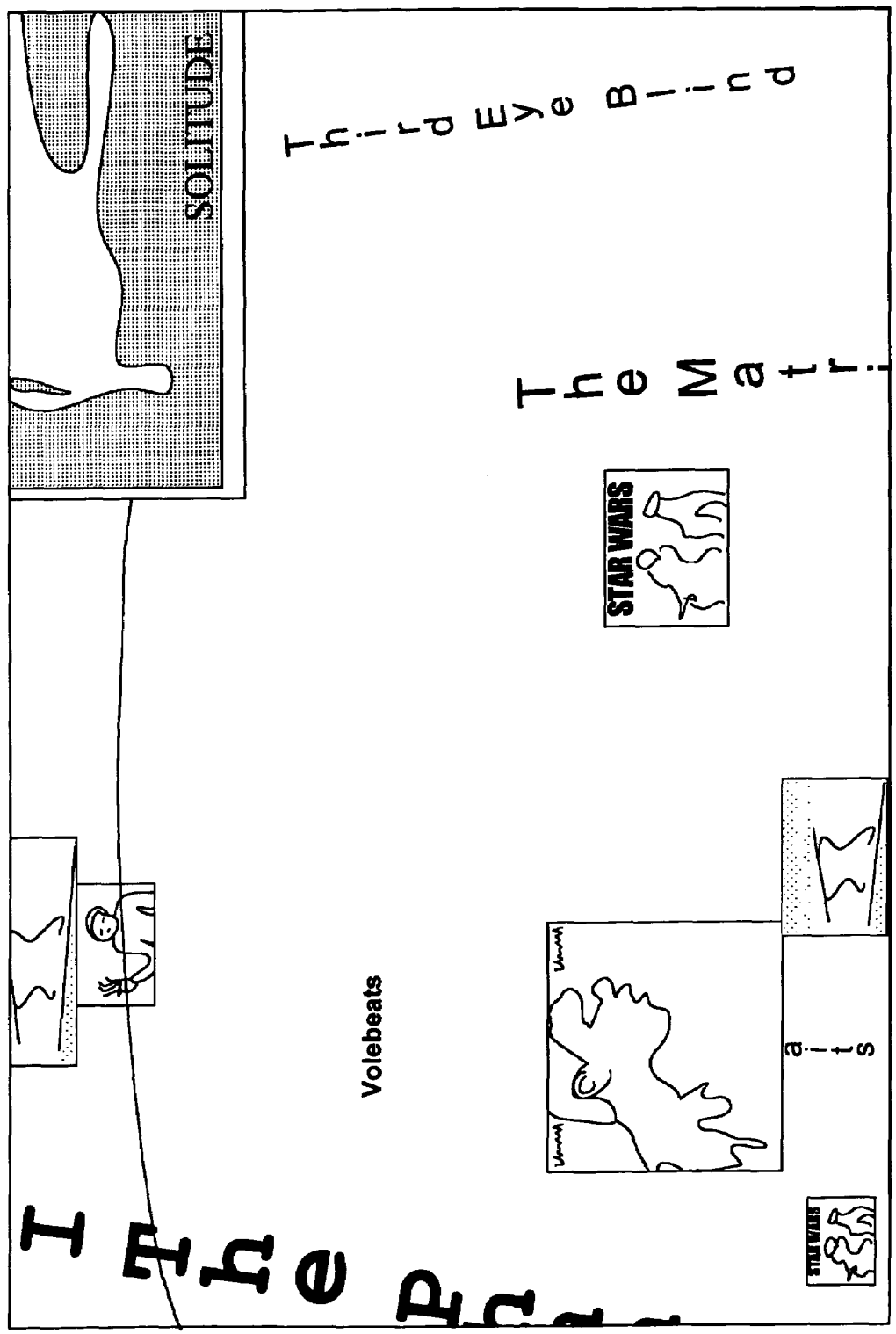
Figure 23:
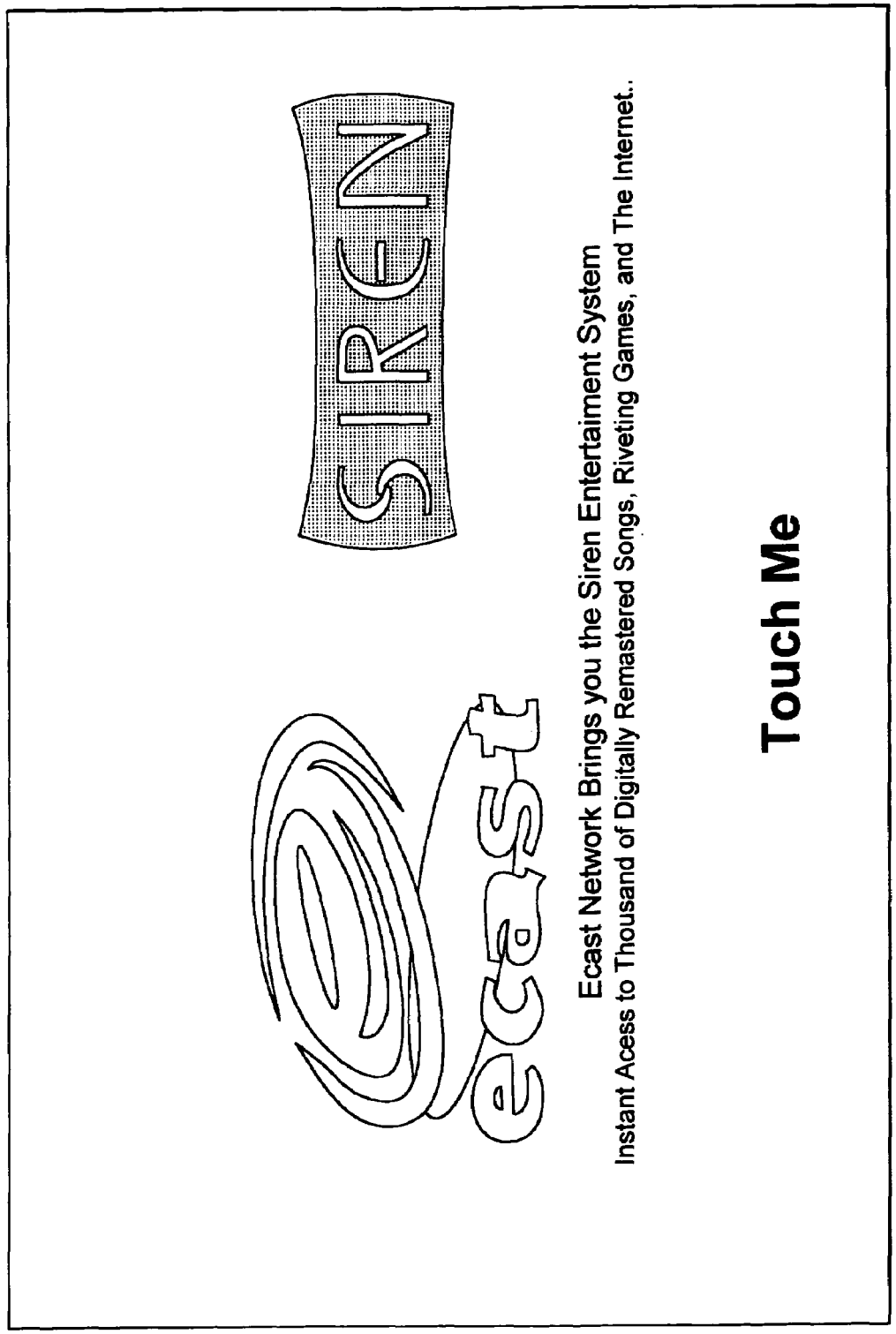
FIGS. 23-26 show GUI screens relating to playing games according to one embodiment.
Figure 24:
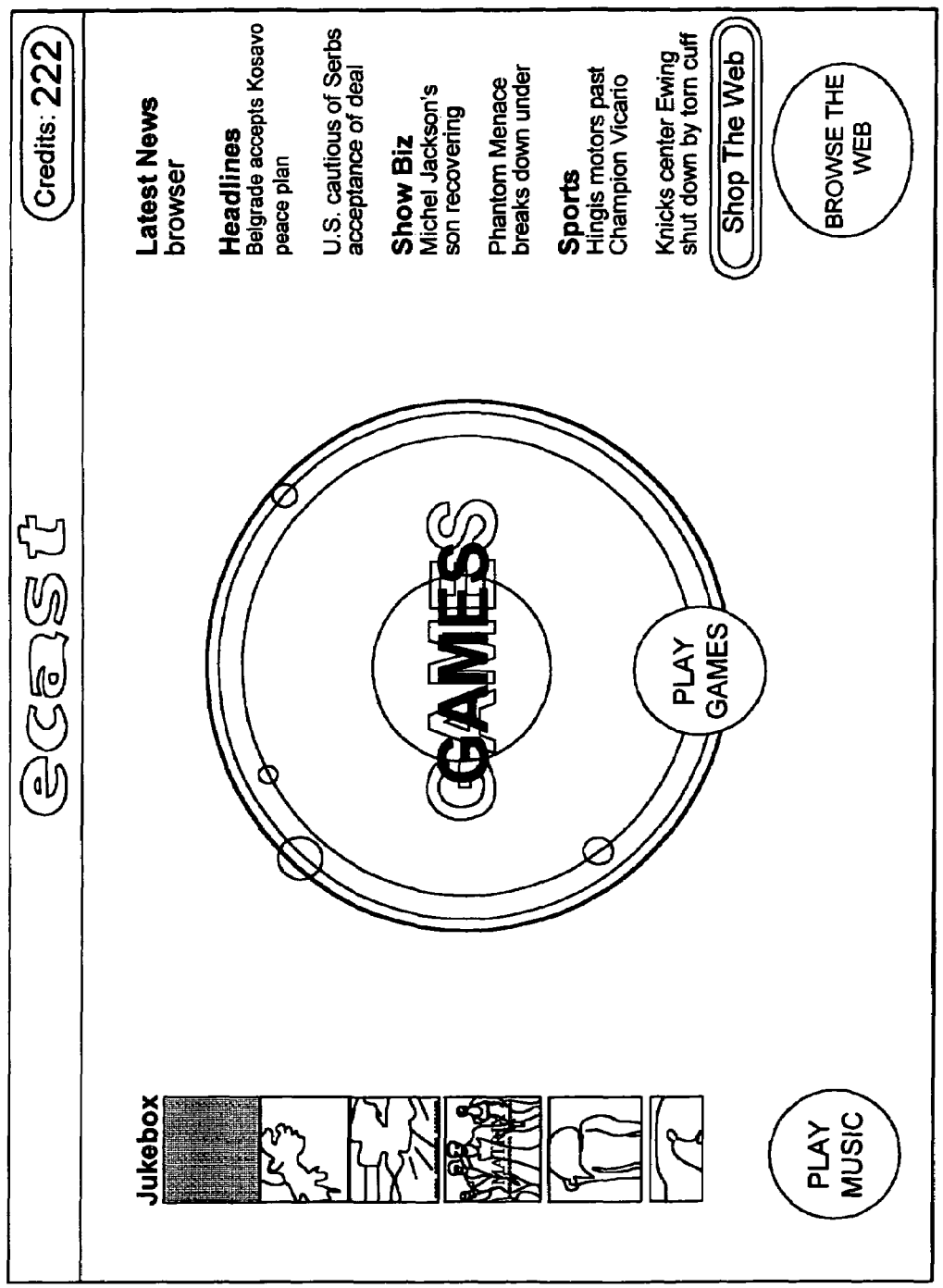
Figure 25:
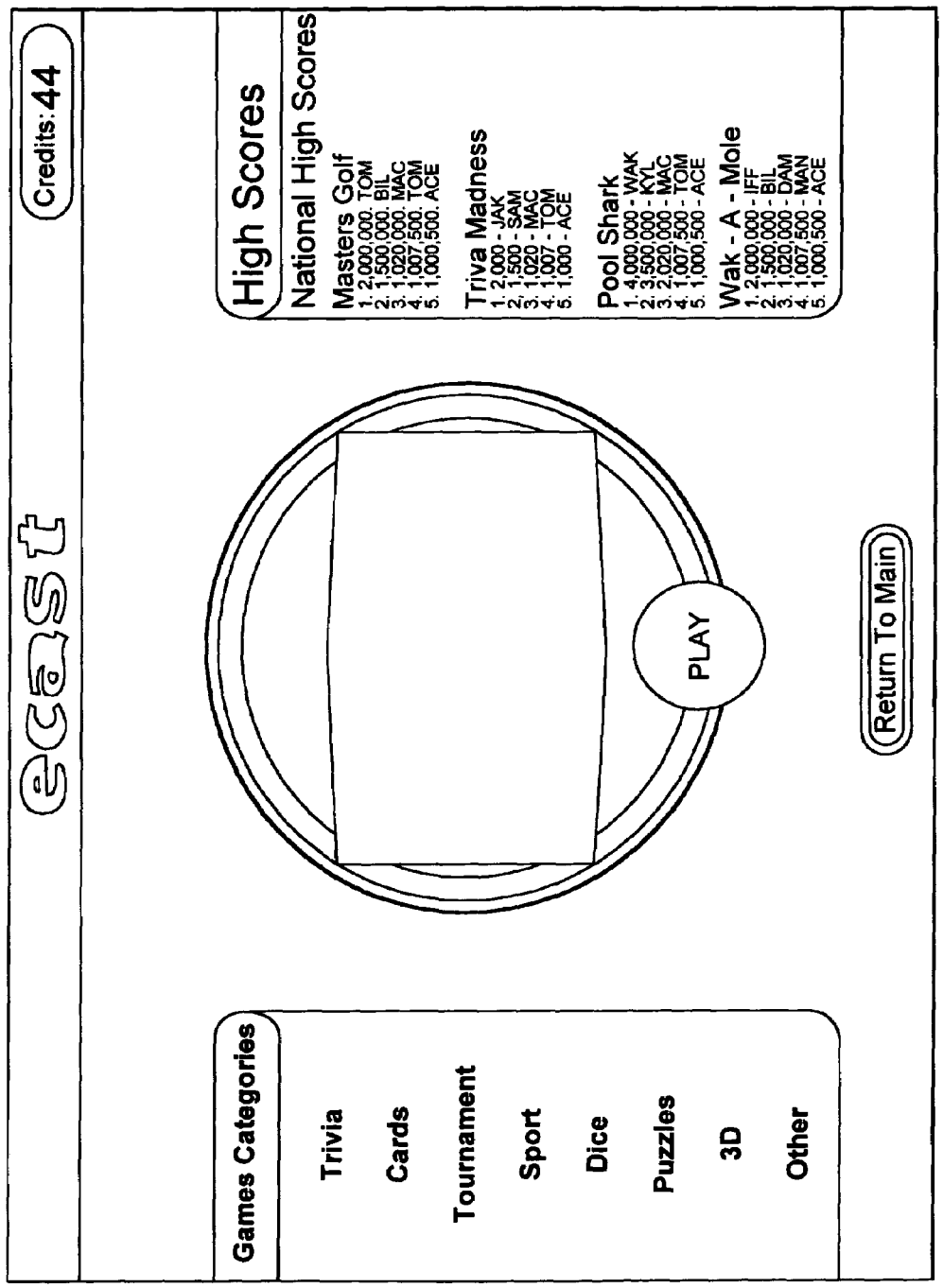
Figure 26:
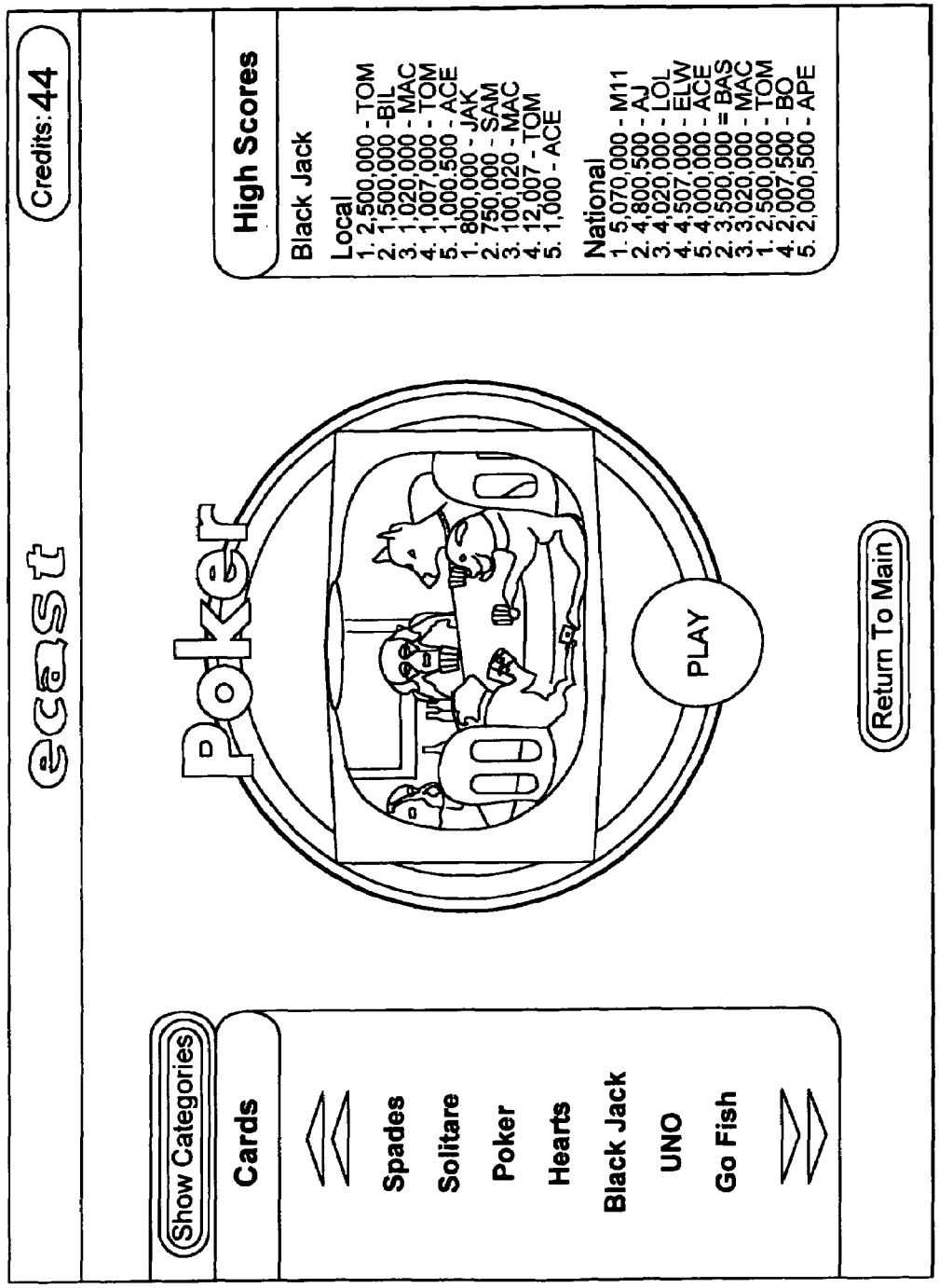

FIG. 12 is a flow diagram of another embodiment of a process of storing music on a unit in a venue. In the process of FIG. 12, the music selection storage of the venue (for example, a music information database, music file storage and album art storage), is initially empty. The music selection storage is filled as music is requested over the WAN. The user selects music from a primary or secondary entertainment unit in the venue when the venue is an initial state at 1402. A request is made over the WAN for the music selection. The central management resource responds to the request by sending the music selection, and the music selection is received, stored and played at 1406. Then it is determined whether the local storage is full at 1408. If the local storage is full, a notification is sent to the central management resource. If the local storage is not full, no action is taken. When the local resource receives a notification that the local storage is full, music selections can still be requested over the WAN and played locally, but they cannot be stored. When an administrator receives the notification that the local storage is full, the administrator empties the local storage and the process of FIG. 12 is repeated.

In another embodiment, the music content stored locally is monitored by the central management resource according to a number of songs stored. Because most songs have a file size that falls within a known range, it is possible to determine how many songs will fill or nearly fill a particular local hard drive in a venue. The central management resource does not allow the number of songs to exceed a predetermined number so that the hard drive is never filled to over a certain percentage of its capacity. If the hard drive is filled beyond the percentage, its performance is noticeably degraded. When the central management resource determines that a local hard drive holds the predetermined number of songs, the disc is either partially or completely emptied. The hard drive contents may be completely or partially replaced according to any scheme, including those described herein.

FIGS. 13-22 show GUI screens relating to playing music according to one embodiment.

FIGS. 23-26 show GUI screens relating to playing games according to one embodiment.

Figure 27:
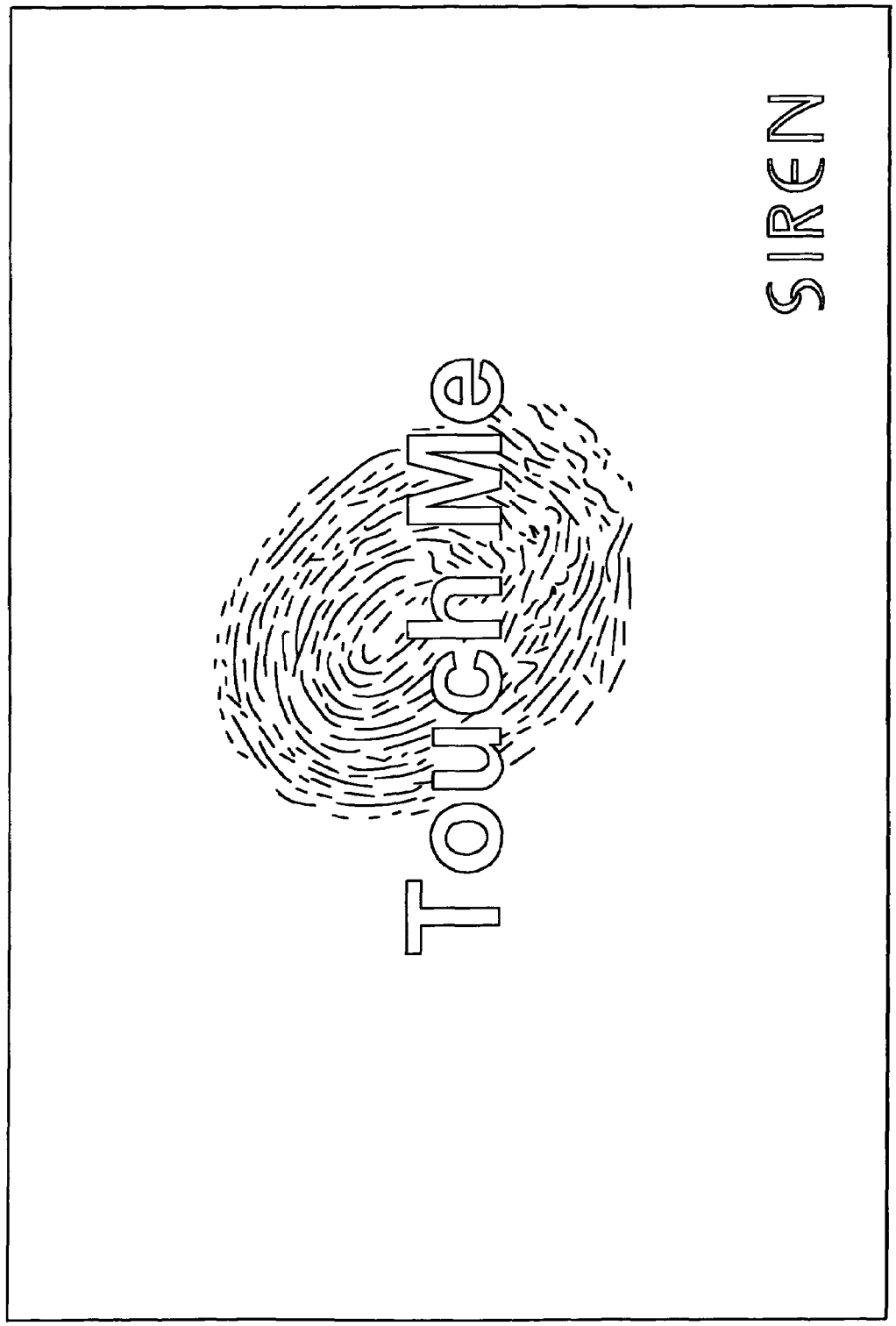
FIG. 27 shows a GUI screen according to one embodiment with fingerprint recognition capability.

FIG. 27 shows a GUI screen according to one embodiment with fingerprint recognition capability.

The invention has been described with reference to particular embodiments. The invention encompasses other embodiments not described, but accessible to one of ordinary skill in the art. The scope of the invention is defined by the following claims.

What is claimed is:
1. A first network entertainment unit, comprising:
a local area network (LAN) interface, through which the first network entertainment unit is configured to communicate with a second network entertainment unit in a venue, wherein the first network entertainment unit and the second network entertainment unit are both located in the venue;
a wide area network (WAN) interface, via which the first network entertainment unit is coupled to a remote central resource, wherein the remote central resource stores entertainment content items available to be retrieved by the first network entertainment unit for performance by the first network entertainment unit;
a user interface, comprising a graphical user interface (GUI) and a user input device, that interacts with a user to allow the user to select one or more entertainment content items;
a local memory that stores a plurality of the entertainment content items and a master list of all of the entertainment content items, including entertainment content items available from a remote central resource;
and
content management logic that, when a selected entertainment content item is not stored in the local memory of the first network entertainment unit, causes;
   i) requesting over the LAN interface the selected entertainment content item;
   ii) when the selected entertainment content item is not stored in the second network entertainment unit, requesting over the WAN interface the selected entertainment content item;
   iii) receiving the requested entertainment content item via the WAN interface; and
   iv) performing the received entertainment content item by the first network entertainment unit.

2. The first network entertainment unit of claim 1, further comprising an infrared (IR) receiver/transmitter for transferring data and commands from the first network entertainment unit and for receiving data and commands in the first network entertainment unit.

3. The first network entertainment unit of claim 1, further comprising a payment device which is selected from the group consisting of a coin acceptor; a bill acceptor; and a credit card/smart card reader.

4. The first network entertainment unit of claim 1, further comprising an audio unit comprising audio speakers and hardware and software for playing music.

5. The first network entertainment unit of claim 1, wherein the GUI comprises:
a music selection GUI configured to receive an indication from the user of a selection of music from the list of entertainment content items stored remotely to be played locally; and
a game selection GUI configured to receive an indication from the user of a selection of games from the list of entertainment content items stored remotely to be played locally.

6. The first network entertainment unit of claim 1, wherein the first network entertainment unit is configured to communicate through the LAN interface with a plurality of similar network entertainment units in the venue.

7. The first network entertainment unit of claim 1, further comprising a local cache capable of storing the requested entertainment content item, wherein the received requested entertainment content item of entertainment content requested from the master list is stored in the local memory cache and performed locally in response to the user request upon receipt via the WAN.

8. The first network entertainment unit of claim 1, wherein the requested entertainment content item is, upon receipt, placed in a queue to be performed.

9. The first network entertainment unit of claim 1, wherein the requested entertainment content item is performed immediately upon receipt.

10. The first network entertainment unit of claim 1, further comprising at least one user identification (ID) device selected from a thumbprint recognition device and a facial recognition device.

11. The first network entertainment unit of claim 1, further comprising a video unit comprising hardware and software for capturing and processing images.

12. A first network entertainment unit, comprising:
- means for interfacing a local area network (LAN), through which the first network entertainment unit is configured to communicate with a second network entertainment unit in a venue, wherein the first network entertainment unit and the second network entertainment unit are both located in the venue;
- means for interfacing a wide area network (WAN), via which the first network entertainment unit is coupled to a remote central resource, wherein the remote central resource stores entertainment content items available to be retrieved by the first network entertainment unit for performance by the first network entertainment unit, and;
- means for interfacing with a user, comprising a graphical user interface (GUI) and a user input device, that interacts with a user to allow the user to select one or more entertainment content items;
- means for storing a number of the entertainment content items and a master list of all of the entertainment content items, including entertainment content items available from a remote central resource; and
- means, when a selected entertainment content item is not stored in the local memory of the first network entertainment unit, for
  i) requesting over the LAN interface means the selected entertainment content item;
  ii) when the selected entertainment content item is not stored in the second network entertainment unit, requesting over the WAN interface means the selected entertainment content item;
  iii) receiving the requested entertainment content item via the WAN interface means; and
  iv) performing the received entertainment content item by the first network entertainment unit.

* * * * *